(12) United States Patent
Wang

(10) Patent No.: US 12,713,009 B2
(45) Date of Patent: Aug. 18, 2026

(54) VIDEO PROCESSING METHOD AND RELATED DEVICE

(71) Applicant: Tencent Technology (Shenzhen) Company Limited, Shenzhen (CN)

(72) Inventor: Yingbin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/938,574

(22) Filed: Nov. 6, 2024

(65) Prior Publication Data

US 2025/0063159 A1 Feb. 20, 2025

Related U.S. Application Data

(63) Continuation of application No. PCT/CN2023/106374, filed on Jul. 7, 2023.

(30) Foreign Application Priority Data

Sep. 30, 2022 (CN) ......................... 202211230593.1

(51) Int. Cl.
*H04N 19/105* (2014.01)
*H04N 19/176* (2014.01)

(52) U.S. Cl.
CPC ......... *H04N 19/105* (2014.11); *H04N 19/176* (2014.11)

(58) Field of Classification Search
None
See application file for complete search history.

(56) References Cited

U.S. PATENT DOCUMENTS

2020/0396445 A1* 12/2020 Seregin ................ H04N 19/159

FOREIGN PATENT DOCUMENTS

CN 102307303 A 1/2012
CN 102695061 A 9/2012

(Continued)

OTHER PUBLICATIONS

International Search Report for PCT/CN2023/106374 dated Nov. 9, 2023 (PCT/ISA/210).

(Continued)

*Primary Examiner* — Christopher G Findley
(74) *Attorney, Agent, or Firm* — Sughrue Mion, PLLC

(57) ABSTRACT

A video processing method, performed by a computer device, includes: performing compound prediction on a current block to be decoded in a video bitstream; determining, for the current block based on significance of one or more first reference predicted values derived from one or more reference blocks of the current block, a target weight group including one or more first weight values, and the significance indicating a degree of impact of a corresponding reference predicted value on decoding performance for the current block; performing weighted prediction on the one or more first reference predicted values based on the one or more first weight values obtain a predicted value of the current block; and reconstructing a decoded image corresponding to the current block based on the predicted value, wherein the one or more first reference predicted values are in a one-to-one correspondence with the one or more reference blocks.

18 Claims, 5 Drawing Sheets

(56) References Cited

FOREIGN PATENT DOCUMENTS

| | | | |
|---|---|---|---|
| CN | 113099229 | A | 7/2021 |
| CN | 113452997 | A | 9/2021 |
| CN | 114885160 | A | 8/2022 |
| CN | 115633168 | A | 1/2023 |
| EP | 3985967 | A1 | 4/2022 |
| JP | 2008-283662 | A | 11/2008 |
| KR | 10-2140398 | B1 | 7/2020 |
| WO | 2020177755 | A1 | 9/2020 |

OTHER PUBLICATIONS

Written Opinion for PCT/CN2023/106374 dated Nov. 9, 2023 (PCT/ISA/237).
Communication issued Oct. 7, 2025 in JP Application No. 2024-563425.
European Search Report dated Dec. 8, 2025 in Application No. EP 23 86 9896.
Office Action dated Feb. 10, 2026 in Japanese Application No. 2024-563425.

* cited by examiner

P

B

Pr (x, y)

B'

$(x_r, y_r)$

Br

VIDEO PROCESSING METHOD AND RELATED DEVICE

CROSS-REFERENCE TO RELATED APPLICATIONS

This application is a continuation application of International Application No. PCT/CN2023/106374 filed on Jul. 7, 2023, which claims priority to Chinese Patent Application No. 202211230593.1, filed with the China National Intellectual Property Administration on Sep. 30, 2022, the disclosures of each being incorporated by reference herein in their entireties.

FIELD

The disclosure relates to the field of audio/video technologies, and in particular, to the field of video coding technologies, and to a video processing method, a video processing apparatus, a computer device, a computer-readable storage medium, and a computer program product.

BACKGROUND

In a block-based hybrid coding framework in video coding technologies, raw video data may be divided into a series of coding blocks ("coding units," or "CUs"), and video data may be compressed according to a video coding method such as prediction, transformation, or entropy coding. To achieve better prediction, a video coding standards, such as an Alliance for Open Media Video 1 (AV1) or a next-generation Alliance for Open Media Video 2 (AV2) of Open Media Alliance (AOM), include a prediction mode referred to as compound prediction. Compound prediction allows use of a plurality of reference video signals for weighted prediction. However, in practice, compound prediction may have low prediction accuracy in weighted prediction, which may affect video coding and decoding performance.

SUMMARY

Provided are a video processing method and a related device.

According to some embodiments, a video processing method, performed by a computer device, includes: acquiring a video bitstream; performing compound prediction on a current block to be decoded in the video bitstream; determining, for the current block based on significance of one or more first reference predicted values derived from one or more reference blocks of the current block, a target weight group including one or more first weight values, and the significance indicating a degree of impact of a corresponding reference predicted value on decoding performance for the current block; performing weighted prediction on the one or more first reference predicted values based on the one or more first weight values obtain a predicted value of the current block; and reconstructing a decoded image corresponding to the current block based on the predicted value, wherein the one or more reference blocks are coding blocks referenced during decoding of the current block in the video bitstream, and wherein the one or more first reference predicted values are in a one-to-one correspondence with the one or more reference blocks.

According to some embodiments, a video processing apparatus, includes: at least one memory configured to store computer program code; and at least one processor configured to read the program code and operate as instructed by the program code, the program code including: acquiring code configured to cause at least one of the at least one processor to acquire a video bitstream; first processing code configured to cause at least one of the at least one processor to perform compound prediction on a current block to be decoded in the video bitstream; first determining code configured to cause at least one of the at least one processor to determine, for the current block based on significance of one or more first reference predicted values derived from one or more reference blocks of the current block, a target weight group including one or more first weight values, the significance indicating a degree of impact of a corresponding reference predicted value on decoding performance for the current block; second processing code configured to cause at least one of the at least one processor to perform weighted prediction on the one or more first reference predicted values based on the one or more first weight values to obtain a predicted value of the current block; and reconstructing code configured to cause at least one of the at least one processor to reconstruct a decoded image corresponding to the current block based on the predicted value, wherein the one or more reference blocks are coding blocks referenced during decoding of the current block in the video bitstream, and wherein the one or more first reference predicted values are in a one-to-one correspondence with the one or more reference blocks.

According to some embodiments, a non-transitory computer-readable storage medium, storing computer code which, when executed by at least one processor, causes the at least one processor to at least: acquire a video bitstream; perform compound prediction on a current block to be decoded in the video bitstream; determine, for the current block based on significance of one or more first reference predicted values derived from one or more reference blocks of the current block, a target weight group including one or more first weight values, the significance indicating a degree of impact of a corresponding reference predicted value on decoding performance for the current block; perform weighted prediction on the one or more first reference predicted values based on the one or more first weight values to obtain a predicted value of the current block; and reconstruct a decoded image corresponding to the current block based on the predicted value, wherein the one or more reference blocks are coding blocks referenced during decoding of the current block in the video bitstream, and wherein the one or more first reference predicted values are in a one-to-one correspondence with the one or more reference blocks.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figures 1A, 1B:
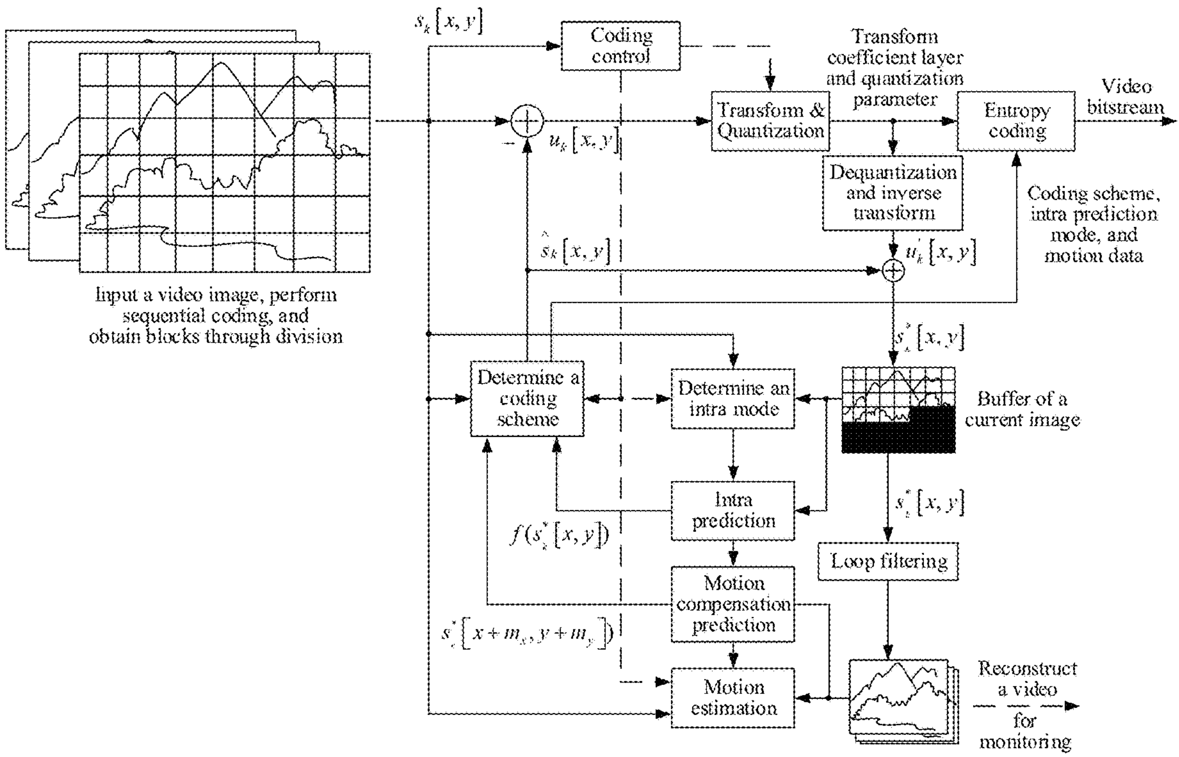
FIG. 1A is an operating flowchart of video coding according to some embodiments.
FIG. 1B is a schematic diagram of inter prediction according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Technical terms included in the disclosure are described below.

1. Video Coding

A video may include one or more video frames, and each video frame includes some video signals of the video. A video signal may be obtained in two manners: being captured by a camera or being generated by a computer. Different obtaining manners correspond to different statistical characteristics. Therefore, a video compression and coding scheme may also vary.

In a mainstream video coding technology, for example, High Efficiency Video Coding (HEVC)/H.265, Versatile Video Coding (VVC)/H.266, Alliance for Open Media Video 1 (AV1), Alliance for Open Media Video 2 (AV2), or Audio Video Coding Standard 3 (AVS3), a hybrid coding framework is used. In the hybrid coding framework, the following operations and processing may be performed on a video:

(1) Block partition structure: An inputted current frame (for example, a video frame that is being encoded or decoded) may be divided into several non-overlapping processing units based on a size of the current frame, and all processing units undergo similar compression operations. The processing unit is referred to as a coding tree unit (CTU) or a largest coding unit (LCU). The CTU may be further divided in a more fine-grained manner to obtain one or more basic coding units that are referred to as coding units (CUs) or coding blocks. Each CU is a most basic element in a coding process. Various coding and decoding processes that may be used for each CU are described in some embodiments.

(2) Predictive coding: Intra prediction, inter prediction, and other modes are included. An original video signal included in a current CU in a current frame (for example, a CU that is being encoded or decoded in the current frame) undergoes prediction by using a reconstructed video signal in a selected reference CU to obtain a residual video signal. Herein, the current CU may also be referred to as a current block, a video frame to which the current block belongs is referred to as the current frame, the reference CU used during prediction for the current block may also be referred to as a reference block of the current block, and a video frame to which the reference block belongs is referred to as a reference frame. An encoder may determine and select a predictive coding scheme for the current CU from different predictive encoding schemes and notify a decoder. The predictive coding schemes may include:

a. Intra (picture) prediction: A reconstructed video signal used during prediction comes from a coded reconstructed area in a same video frame. For example, a current block and a reference block belong to a same video frame. Intra prediction may be used to eliminate spatial redundancy based on correlation between adjacent pixels in a same video frame. In video coding, adjacent pixels are reconstructed pixels of coded CUs around a current CU in a same video frame.

b. Inter (picture) prediction: A reconstructed video signal used during prediction comes from another coded video frame different from a current frame. For example, a current block and a reference block belong to different video frames.

(3) Transform & quantization: A residual video signal may be converted into transform domain through a transform operation such as discrete Fourier transform (DFT) or discrete cosine transform (DCT) and referred to as a transform coefficient. The residual video signal in transform domain further undergoes a lossy quantization operation, and information is lost, to facilitate compression and expression of a quantized signal.

In some video coding standards, a plurality of transform modes may be available for selection. Therefore, an encoder may select one of the transform modes for a current CU and notify a decoder. Precision of quantization may be determined by a quantization parameter (QP). When a value of the QP is large, a transform coefficient with a large value range is to be quantized into one output. This may result in greater distortion and a lower bit rate. On the contrary, when a value of the QP is small, a transform coefficient with a small value range is to be quantized into one output. This may result in smaller distortion and corresponds to a high bit rate.

(4) Entropy coding or statistical coding: A quantized transform domain signal undergoes statistical compression and coding based on appearance frequency of each value, and a binary (0 or 1) video bitstream is finally outputted. In addition, other information, such as a selected predictive coding scheme and a motion vector, is generated during coding. The other information also may undergo entropy coding to reduce a bit rate. The statistical coding is a lossless coding scheme, and can reduce a bit rate for expressing a same signal. Statistical coding schemes may include variable length coding (VLC) or content adaptive binary arithmetic coding (CABAC).

(5) Loop filtering: A decoded image corresponding to a coded CU may be reconstructed by performing dequantization, inverse transform, and predictive compensation operations (inverse operations of (2) to (4)) on the CU. Compared with an original image, some information of the reconstructed decoded image is different from that of the original image due to impact of quantization, leading to distortion. Therefore, a filter may be configured to perform a filtering operation on the reconstructed decoded image to alleviate a degree of distortion caused by quantization. For example, the filter may be a deblocking filter, a sample adaptive offset (SAO) filter, or an adaptive loop filter (ALF). A filtered reconstructed decoded image is to serve as a reference CU for another CU that may be encoded, and used in a prediction process for the another CU. Therefore, the filter operation is also referred to as loop filtering, for example, a filter operation within a coding loop.

Based on related descriptions of the foregoing operations (1) to (5), some embodiments provide an operating flowchart of a video encoder. FIG. 1A is an exemplary basic operating flowchart of a video encoder. In FIG. 1A, an example in which a current block is a $k^{th}$ CU (for example, $s_k[x, y]$ shown in FIG. 1A) in a current frame (a current image) is used for description, where k is a positive integer, and k is less than or equal to a total quantity of CUs included in the current frame. $s_k[x, y]$ represents a pixel with coordinates of [x, y] in the $k^{th}$ CU, where x represents a horizontal coordinate of the pixel, and y represents a vertical coordinate of the pixel. A predicted signal may be obtained by performing motion compensation, intra prediction, or other processing on $s_k[x, y]$. The predicted signal $s_k[x, y]$ is subtracted from an original signal $s_k[x, y]$ to obtain a residual video signal $u_k[x, y]$. The residual video signal $u_k[x, y]$ is transformed and quantized. Data outputted from quantization may be processed in two different manners A and B.

A: The data outputted from quantization may be transmitted to an entropy encoder for entropy coding to obtain a coded bitstream (for example, a video bitstream), and the bitstream is outputted to a buffer for storage and waiting for transmission.

B: The data outputted from quantization may undergo dequantization and inverse transform to obtain an inversely transformed residual video signal $u_k'[x, y]$. The inversely transformed residual video signal $u_k'[x, y]$ is added to a predicted signal $\hat{s}_k[x, y]$ to obtain a new predicted signal $s_k^*[x, y]$, and the new predicted signal $s_k^*[x, y]$ is transmitted to a buffer of a current image for storage. The new predicted signal $s_k^*[x, y]$ may undergo intra prediction to obtain $f(s_k^*[x, y])$. The new predicted signal $s_k^*[x, y]$ may undergo loop filtering to obtain a reconstructed signal $s_k[x, y]$, and the reconstructed signal $s_k[x, y]$ is transmitted to a decoded image buffer for storage, to be used for generating a reconstructed video. The reconstructed signal $s_k^*[x, y]$ undergoes motion compensation prediction to obtain $s_r^*[x+mx, y+my]$, where $s_r^*[x+mx, y+my]$ may represent a reference block, and mx and my represent a horizontal component and a vertical component of a motion vector of the reference block respectively.

In some embodiments, a block-based hybrid coding framework is used in mainstream video coding standards such as HEVC, VVC, AVS3, AV1, and AV2. Original video data may be divided into a series of coding blocks, and video data is compressed according to a video coding method such as prediction, transformation, or entropy coding. Motion compensation is a prediction method that may be used in video coding. During motion compensation, a predicted value of a current block is derived from a coded reference block based on a redundancy characteristic of video content in time domain or space domain. Such prediction methods include inter prediction, intra block copy prediction, intra string copy prediction, and the like. In some embodiments, these prediction methods may be used alone or in combination. For a coding block for which these prediction methods are used, one or more two-dimensional displacement vectors may be explicitly or implicitly encoded in a video bitstream. The displacement vector is configured for indicating a displacement of a current block (or a co-located block of the current block) relative to one or more reference blocks of the current block.

In different prediction modes and different implementations, the displacement vector may have different names. Accordingly, descriptions are collectively provided in the following manner: (1) A displacement vector in inter prediction is referred to as a motion vector (MV). (2) A displacement vector in intra block copy prediction is referred to as a block vector (BV). (3) A displacement vector in intra string copy prediction is referred to as a string vector (SV). The following describes a technology related to inter prediction by using inter prediction as an example.

Inter prediction: During inter prediction, a pixel of a current image is predicted by using a pixel of an adjacent coded image based on time domain correlation of a video, to eliminate time domain redundancy of the video and reduce a quantity of bits in coded residual data. FIG. 1B is a schematic diagram of inter prediction according to some embodiments. In FIG. 1B, P is a current frame, Pr is a reference frame, B is a current block, and Br is a reference block of B. A coordinate position of B' in an image is the same as that of B (for example, B' is a co-located block of B). Coordinates of Br are $(x_r, y_r)$, and coordinates of B' are (x, y). A displacement between the current block and the reference block of the current block is referred to as a monitor vector (MV): $MV=(x_r-x, y_r-y)$.

Adjacent blocks in time domain or space domain are strongly correlated. Therefore, a quantity of bits for encoding the MV may be further reduced by using an MV prediction technology. In H.265/HEVC, inter prediction includes two MV prediction technologies: merge and advanced motion vector prediction (AMVP). In a merge mode, an MV candidate list is created for a current prediction unit (PU), and includes five candidate MVs (and their corresponding reference images). The five candidate MVs are traversed, and an MV with a lowest rate-distortion cost is selected as the MV. If an encoder or decoder creates a candidate list in the same manner, the encoder may transmit an index of the selected MV in the candidate list. In AV1 and AV2, a technology referred to as dynamic motion vector prediction (DMVP) is used to predict an MV.

Video coding standards may use a plurality of reference frames for inter prediction. The AV1 standard and the next-generation AV2 standard of AOM that is currently under development includes a prediction mode referred to as compound prediction. In the compound prediction mode, two reference frames may be used for a current block for inter prediction, and weighted combination is performed on inter predicted values to derive a predicted value of the current block, or weighted combination is performed by using an inter predicted value derived from a reference frame and an intra predicted value derived from a current frame to derive a predicted value of the current block. The current block is a coding block that is being encoded (or decoded). In some embodiments, both the inter predicted value and the intra predicted value are referred to as a reference predicted value. During compound prediction, the predicted value of the current block is derived by using following formula:

$$P(x, y) = (w(x, y) \cdot P_0(x, y) + (1 - w(x, y)) \cdot P_1(x, y))/2,$$

where $P(x, y)$ is the predicted value of the current block, $P_0(x, y)$ and $P_1(x, y)$ are two reference predicted values corresponding to the current block (x, y), and $w(x, y)$ is a weight applied to a first reference predicted value $P_0(x, y)$.

In some embodiments, to reduce complexity of weighted prediction in video coding, integer calculation may be performed instead of floating-point calculation. The predicted value of the current block is derived through integer calculation by using the following formula:

$$P(x, y) = (w(x, y) \cdot P_0(x, y) + (64 - w(x, y)) \cdot P_1(x, y) + 32) >> 6,$$

where a weight value $w(x, y)$ and reference predicted values $P_0(x, y)$ and $P_1(x, y)$ are all integers, a right shift operation is used to replace division, ">>6" indicates a right shift of 6 bits, exact division by 64 can be implemented through the right shift of 6 bits, and 32 is an offset added for rounding.

According to a current video coding standard, a weighting mode is used in compound prediction. For example, P0 and P1 have equal weight values, and weights corresponding to reference predicted values that correspond to different positions are set to fixed values. A formula may be as follows:

$$P(x, y) = (32 \times P_0(x, y) + 32 \times P_1(x, y) + 32) >> 6$$

2. Video Decoding

On a decoder side, for each CU, based on a video bitstream being obtained, the video bitstream first undergoes entropy decoding to obtain information about various predictive coding schemes and quantized transform coefficients, and the transform coefficients undergo dequantization and inverse transform to obtain a residual video signal. In addition, based on known information about a predictive coding scheme, a predicted signal (referred to as a predicted value) corresponding to the CU may be obtained, and the residual video signal is added to the predicted signal to obtain a reconstructed video signal. The reconstructed video signal may be configured for reconstructing a decoded image corresponding to the CU. Finally, the reconstructed video signal may undergo a loop filtering operation to generate a final output signal.

Based on the foregoing related descriptions, some embodiments provide a video processing solution. The video processing solution may be applied to a video encoder or a video compression product in which compound prediction (or weighted prediction based on a plurality of reference frames) is used. The video processing solution, according to some embodiments, is as follows:

Encoder side: Compound prediction may be performed on a CU included in a video frame to obtain N reference predicted values of the CU, N being an integer greater than 1. An appropriate weight is adaptively selected for the CU based on significance of the N reference predicted values to perform weighted prediction to obtain a predicted value of the CU. The weighted prediction means performing weighted prediction on the N reference predicted values of the CU by using the adaptively selected weight. A video is encoded based on the predicted value of the CU to generate a video bitstream, and the video bitstream is transmitted to a decoder side.

Decoder side: During decoding of a CU in a video bitstream, it may be determined, based on information about a predictive coding scheme, that compound prediction is to be performed on the CU in the video bitstream, and an appropriate weight is adaptively selected for the CU based on significance of N reference predicted values to perform weighted prediction. Weighted prediction is performed on the N reference predicted values by using the adaptively selected weight to obtain a predicated value of the CU, and a decoded image corresponding to the CU is reconstructed by using the predicted value of the CU.

As described above, according to a stipulation in the current video coding standard, during compound prediction, equal weight values are used to perform weighted prediction on reference predicted values derived from different reference blocks. However, in practical application, reference predicted values derived from different reference blocks may have unequal significance, and use of equal weight values cannot indicate a significance difference between reference predicted values. In this case, use of existing standards affect the accuracy of prediction. According to some embodiments, however, during compound prediction, significance of reference predicted values derived from different reference blocks is fully considered, and during compound prediction, an appropriate weight may be adaptively selected for a CU based on significance of reference predicted values to perform weighted prediction. This extends a weighted prediction method in the video coding standard and can improve accuracy of prediction for a CU, to improve coding performance.

Figure 2:
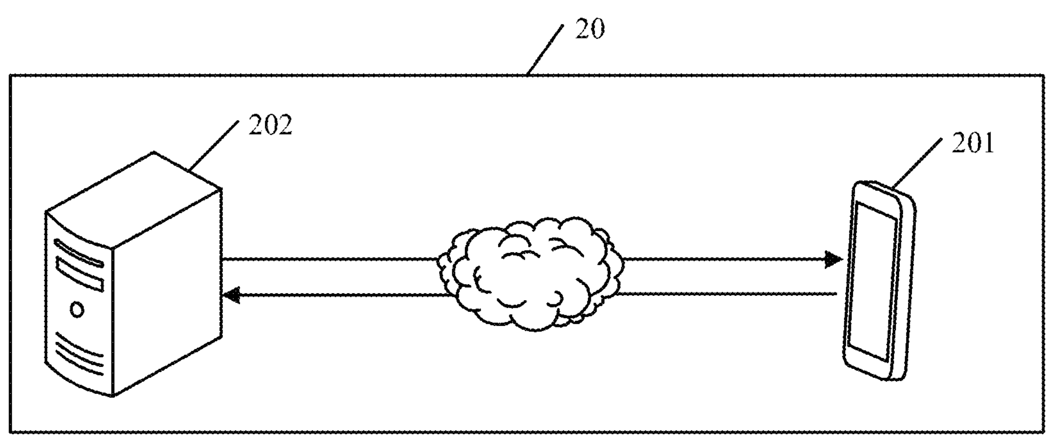
FIG. 2 is a schematic structural diagram of a video processing system according to some embodiments.

The following describes a video processing system provided in some embodiments. FIG. 2 is a schematic architectural diagram of a video processing system according to some embodiments. The video processing system 20 may include an encoding device 201 and a decoding device 202. The encoding device 201 is located on an encoder side, and the decoding device is located on a decoder side. The encoding device 201 may be a terminal or a server, and the decoding device 202 may be a terminal or a server. A communication connection may be established between the encoding device 201 and the decoding device 202. The terminal may be a smartphone, a tablet computer, a notebook computer, a desktop computer, a smart speaker, a smartwatch, an in-vehicle terminal, a smart television, or the like, but is not limited thereto. The server may be an independent physical server, or may be a server cluster or a distributed system that includes a plurality of physical servers, or may be a cloud server that provides cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

(1) For the Encoding Device 201:

The encoding device 201 may obtain a to-be-encoded video. The video may be obtained in a manner of being captured by a camera device or being generated by a computer. The camera device may be a hardware component disposed in the encoding device 201. For example, the camera device may be a camera, a stereo camera, or a light field camera disposed in a terminal. The camera device may be a hardware apparatus connected to the encoding device 201, for example, a camera connected to a server.

A video includes one or more video frames, and the encoding device 201 may divide each video frame into one or more CUs, and encode each CU. During coding of any CU, compound prediction may be performed on the CU being encoded (referred to as a current block) to obtain N reference predicted values of the current block, and significance of the reference predicted values is determined based on a full consideration of factors such as a bit rate consumed during weighted prediction and quality loss of the current block during coding. An appropriate target weight group is adaptively selected for the current block based on the significance of the reference predicted values. The target weight group may include one or more weight values. Weighted prediction is performed on the N reference predicted values based on the weight value in the target weight group to obtain a predicted value of the current block. The predicted value of the current block may be understood as a predicted signal corresponding to the current block, and the predicted value of the current block may be configured for reconstructing a decoded image corresponding to the current block.

The N reference predicted values of the current block are derived from N reference blocks of the current block. One reference predicted value corresponds to one reference block. A video frame to which a reference block belongs is a reference frame, and a video frame to which the current block belongs is a current frame. A positional relationship between the N reference blocks and the current block may include but is not limited to any one of the following: The N reference blocks respectively belong to N reference frames, and the N reference frames and the current frame are different video frames in a video bitstream. The N reference blocks belong to one reference frame, and the reference frame and the current frame are different video frames in a video bitstream. One or more reference blocks of the N reference blocks belong to the current frame, remaining reference blocks of the N reference blocks belong to one or more reference frames, and the one or more reference frames and the current frame are different video frames in a video bitstream. The N reference blocks and the current block all belong to the current frame. It can be learned that a prediction mode of compound prediction in some embodiments includes an inter prediction mode in which at least two reference frames may be used for inter prediction; also includes a combination prediction mode in which at least one reference frame may be used for inter prediction and a current frame may be used for intra prediction; and further includes an intra prediction mode in which a current frame may be used for intra prediction.

Corresponding to different prediction modes of compound prediction, a manner of deriving the N reference predicted values of the current block may include any one of the following: The N reference predicted values of the current block are derived by performing inter prediction by using the N reference blocks of the current block respectively. In this case, the N reference predicted values may be referred to as inter predicted values. At least one of the N reference predicted values of the current block is derived by performing inter prediction by using at least one of the N reference blocks of the current block, and the reference predicted value may be referred to as an inter predicted value. A remaining reference predicted value is derived by performing intra prediction by using a remaining reference block in the N reference blocks, and the reference predicted value may be referred to as an intra predicted value.

The encoding device 201 performs transform coding, quantization, entropy coding, and other operations on the video based on the predicted value of the CU included in the video frame to obtain a video bitstream, and transmits the video bitstream to the decoding device 202, so that the decoding device 202 decodes the video bitstream.

(2) For the Decoding Device 202:

Based on receiving a video bitstream transmitted by the encoding device 201, the decoding device 202 may decode the video bitstream and reconstruct a video corresponding to the video bitstream. The decoding device 202 may perform entropy decoding on the video bitstream to obtain prediction modes and quantized transform coefficients of CUs in the video bitstream, perform compound prediction on a current block (for example, a CU being decoded) based on a prediction mode of the current block to obtain N reference predicted values of the current block, and determine whether the current block allows use of adaptive weighted prediction.

If it is determined that the current block allows use of adaptive weighted prediction, a target weight list may be determined from one or more weight lists based on significance of the N reference predicted values, and a target weight group used for weighted prediction may be determined for the current block from the target weight list, the target weight group including one or more weight values. Weighted prediction is directly performed on the N reference predicted values based on the weight value in the target weight group to obtain a predicted value of the current block. If it is determined that the current block does not allow use of adaptive weighted prediction, weighted prediction may be performed on the N reference predicted values according to a video coding standard. For example, weighted prediction is performed on the reference predicted values by using equal weight values to obtain a predicted value of the current block.

In addition, the decoding device 202 performs dequantization and inverse transform on a quantized transform coefficient to obtain a residual signal value of the current block, and superposes the predicted value and the residual signal value of the current block to obtain a reconstructed value of the current block, and reconstructs, based on the reconstructed value, a decoded image corresponding to the current block. The decoded image obtained through decoding may be used as a reference image for decoding another CU, and may also be configured for reconstructing a video.

In some embodiments, compound prediction is used in both coding and decoding of a video. In addition, during compound prediction, significance of reference predicted values derived from different reference blocks is fully considered, and during compound prediction, an appropriate weight may be adaptively selected for a CU based on significance of reference predicted values to perform weighted prediction. This extends a weighted prediction method which the video coding standard and can improve accuracy of prediction for a CU, to improve coding and decoding performance.

Figure 3:
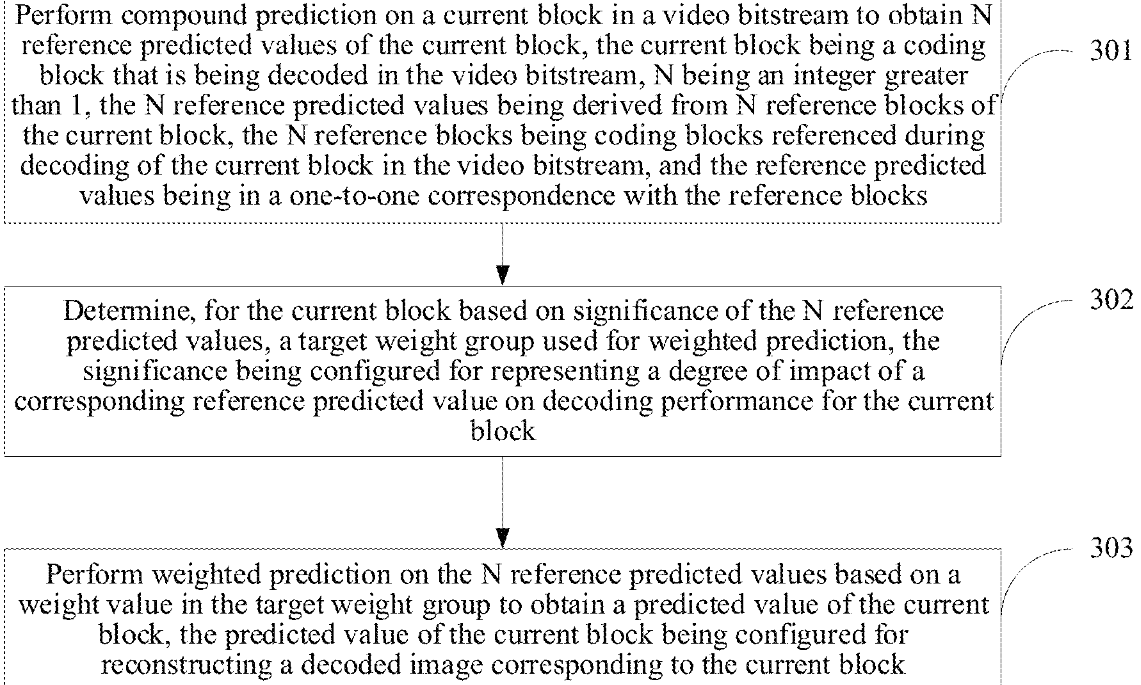
FIG. 3 is a schematic flowchart of a video processing method according to some embodiments.

The following describes a video processing method provided in some embodiments. FIG. 3 is a schematic flowchart of a video processing method according to some embodiments. The video processing method may be performed by the decoding device in the video processing system, and the video processing method described in some embodiments may include the following operations 301 to 303.

301: Perform compound prediction on a current block in a video bitstream to obtain N reference predicted values of the current block, the current block being a coding block that is being decoded in the video bitstream, N being an integer greater than 1, the N reference predicted values being derived from N reference blocks of the current block, the N reference blocks being coding blocks referenced during decoding of the current block in the video bitstream, and the reference predicted values being in a one-to-one correspondence with the reference blocks.

The video bitstream includes one or more video frames, and each video frame may include one or more coding blocks. When decoding the video bitstream, the decoding device may obtain a coding block from the video bitstream, and the decoding device may use a current to-be-decoded coding block as the current block. The N reference predicted values may be derived from the N reference blocks, and one reference predicted value corresponds to one reference block. The N reference predicted values are obtained based on the N reference blocks, and the reference predicted values are in a one-to-one correspondence with the reference blocks. The N reference blocks are coding blocks referenced during decoding of the current block in the video bitstream. In some embodiments, a video frame to which a reference block belongs may be a reference frame, and a video frame to which the current block belongs is a current frame.

A positional relationship between the N reference blocks and the current block includes any one of the following: (1) The N reference blocks respectively belong to N reference frames, and the N reference frames and the current frame may be different video frames in the video bitstream. For example, N=2, one of the two reference blocks belongs to a reference frame 1, and the other reference block belongs to a reference frame 2. The reference frame 1, the reference frame 2, and the current frame are different video frames in the video bitstream. (2) The N reference blocks belong to one reference frame, and the reference frame and the current frame may be different video frames in the video bitstream. For example, N=2, both reference blocks belong to a reference frame 1, and the reference frame 1 and the current frame are different video frames in the video bitstream. (3) One or more reference blocks of the N reference blocks belong to the current frame, remaining reference blocks of the N reference blocks belong to one or more reference frames, and the one or more reference frames and the current frame are different video frames in the video bitstream. For example, N=4, and the four reference blocks are a reference block 1, a reference block 2, a reference block 3, and a reference block 4. The reference block 1 belongs to the current frame, the remaining reference block 2, reference block 3, and reference block 4 all belong to a reference frame 1, and the reference frame 1 and the current frame are different video frames in the video bitstream. For another example, the reference block 1 and the reference block 2 belong to the current frame, the remaining reference block 3 may belong to a reference frame 1, the reference block 4 belongs to a reference frame 2, and the reference frame 1, the reference frame 2, and the current frame are different video frames in the video bitstream. (4) The N reference blocks and the current block all belong to the current frame. For example, N=2, and both reference blocks belong to the current frame.

Based on the positional relationship between the N reference blocks and the current block in (1) to (4), it can be learned that a prediction mode of compound prediction in some embodiments include an inter prediction mode in which at least two reference frames may be used for inter prediction; may also include a combination prediction mode in which at least one reference frame may be used for inter prediction and the current frame may be used for intra prediction; and further includes an intra prediction mode in which the current frame may be used for intra prediction.

Corresponding to different prediction modes of compound prediction, a manner of deriving the N reference predicted values of the current block may include any one of the following: The N reference predicted values of the current block are derived by performing inter prediction by using the N reference blocks of the current block respectively. In this case, the N reference predicted values may be referred to as inter predicted values. At least one of the N reference predicted values of the current block is derived by performing inter prediction by using at least one of the N reference blocks of the current block, and the reference predicted value may be referred to as an inter predicted value. A remaining reference predicted value is derived by performing intra prediction by using a remaining reference block in the N reference blocks, and the reference predicted value may be referred to as an intra predicted value. In some embodiments, the N reference blocks may source from different video frames, and may source from the current frame to which the current block belongs or source from different reference frames, to adapt to different compound prediction scenarios and ensure coding and decoding performance of compound prediction in different scenarios.

In some embodiments, before performing operation 302, the decoding device may first determine whether the current block satisfies a condition for adaptive weighted prediction, for example, determine the condition for adaptive weighted prediction, and perform operation 302 if the current block satisfies the condition for adaptive weighted prediction. By determining whether the current block satisfies the condition for adaptive weighted prediction, the decoding device may adaptively select a weight for weighted prediction, to further improve accuracy of prediction and improve coding performance.

That the current block satisfies the condition for adaptive weighted prediction includes at least one of the following:

(a) A sequence header of a frame sequence to which the current block belongs includes a first indication field, and the first indication field indicates that all coding blocks in the frame sequence allow use of adaptive weighted prediction, the frame sequence being a sequence constituted by a plurality of video frames in the video bitstream in order. When the sequence header of the frame sequence includes the first indication field, the first indication field is configured for indicating that all coding blocks included in the frame sequence allow use of adaptive weighted prediction.

In some embodiments, the first indication field may be denoted as seq_acp_flag. The first indication field may indicate, based on a value, whether a coding block in the frame sequence allows use of adaptive weighted prediction. If the first indication field is a first preset value (for example, 1), all coding blocks in the frame sequence allow use of adaptive weighted prediction. It may be determined that the current block satisfies the condition for adaptive weighted prediction. If the first indication field is a second preset value (for example, 0), none of coding blocks in the frame sequence allows use of adaptive weighted prediction. It may be determined that the current block does not satisfy the condition for adaptive weighted prediction.

(b) A slice header of a current slice to which the current block belongs includes a second indication field, and the second indication field indicates that a coding block in the current slice allows use of adaptive weighted prediction. A video frame may be divided into a plurality of image slices, and each image slice includes one or more coding blocks. The current slice is an image slice to which the current block belongs, for example, an image slice that is being decoded. When the slice header of the current slice includes the second indication field, the second indication field may be configured for indicating that all coding blocks included in the current slice allow use of adaptive weighted prediction.

In some embodiments, the second indication field may be denoted as slice_acp_flag. The second indication field may indicate, based on a value, whether a coding block in the current slice allows use of adaptive weighted prediction. If the second indication field is a first preset value (for example, 1), all coding blocks in the current slice allow use of adaptive weighted prediction. It may be determined that the current block satisfies the condition for adaptive weighted prediction. If the second indication field is a second preset value (for example, 0), none of coding blocks in the current slice allows use of adaptive weighted prediction. It may be determined that the current block does not satisfy the condition for adaptive weighted prediction.

(c) A frame header of the current frame to which the current block belongs includes a third indication field, and the third indication field indicates that a coding block in the current frame allows use of adaptive weighted prediction. When the frame header of the current frame includes the third indication field, the third indication field may be configured for indicating that all coding blocks included in the current frame allow use of adaptive weighted prediction.

In some embodiments, the third indication field may be denoted as pic_acp_flag. The third indication field indicates, based on a value, whether the current frame allows use of adaptive weighted prediction. If the third indication field is a first preset value (for example, 1), a coding block in the current frame allows use of adaptive weighted prediction. It may be determined that the current block satisfies the condition for adaptive weighted prediction. If the third indication field is a second preset value (for example, 0), a coding block in the current frame does not allow use of adaptive weighted prediction. It may be determined that the current block does not satisfy the condition for adaptive weighted prediction.

(d) During the compound prediction, at least two reference frames are used for inter prediction for the current block.

(e) During the compound prediction, at least one reference frame is used for inter prediction for the current block, and the current frame is used for intra prediction. For example, a reference frame 1 is used for inter prediction for the current block, and the current frame is used for intra prediction. In this case, it may be determined that the current block satisfies the condition for adaptive weighted prediction.

(f) A motion type of the current block is a specified motion type. For example, the motion type of the current block is translation. In this case, it is determined that the current block satisfies the condition for adaptive weighted prediction.

(g) A preset motion vector prediction mode is used for the current block. For example, the preset motion vector prediction mode for the current block is NEAR_NEARMV. In this case, it may be determined that the current block satisfies the condition for adaptive weighted prediction.

In the AV1 and AV2 standards, a technology referred to as dynamic motion vector prediction is used to predict an MV. An MV may be predicted by using spatial adjacent blocks in the current frame or temporal adjacent blocks in a reference frame. For single-reference inter prediction, each reference frame has a separate predicted MV list. For compound inter prediction, predicted MV lists corresponding to different reference frames constitute a predicted MV group list, and use of a plurality of MV prediction modes, such as NEAR_NEARMV, NEAR_NEWMV, NEW_NEAR_MV, NEW_NEWMV, GLOBAL_GLOBALMV, and JOINT_NEWMV, is allowed.

NEAR_NEARMV: MVs corresponding to two reference frames are MVs in a predicted MV group.

NEAR_NEWMV: A first MV is a first predicted MV in a predicted MV group, and a second MV is derived based on a motion vector difference (MVD) obtained from the video bitstream through decoding and a second predicted MV in the predicted MV group. The MVD is a difference between a current MV and a predicted MV.

NEW_NEARMV: A first MV is derived based on an MVD obtained from the video bitstream through decoding and a first predicted MV in a predicted MV group, and a second MV is a second predicted MV in the predicted MV group.

NEW_NEWMV: A first MV is derived based on an MVD 1 obtained from the video bitstream through decoding and a first predicted MV in a predicted MV group, and a second MV is derived based on an MVD 2 obtained from the video bitstream through decoding and a second predicted MV in the predicted MV group.

GLOBAL_GLOBALMV: An MV is derived based on global motion information of each frame.

JOINT_NEWMV: This mode is similar to NEW_NEWMV. However, the video bitstream includes one MVD, and the other MVD is derived based on information of reference frames.

The preset motion vector prediction mode in some embodiments may be one or more of NEAR_NEARMV, NEAR_NEWMV, NEW_NEARMV, NEW_NEWMV, GLOBAL_GLOBALMV, and JOINT_MV. The preset motion vector prediction mode is not limited to the foregoing MV prediction modes. In other standards, such as H.265 and H.266, a motion vector prediction mode may be determined by combining merge and AMVP.

(h) A preset interpolation filter is used for the current block. A video coding process may include different coding tools, including a plurality of types of interpolation filters, such as a linear interpolation filter and a cascaded integrator-comb (CIC) interpolation filter. The preset interpolation filter in some embodiments may be any one of the plurality of types of interpolation filters. For example, the preset interpolation filter may be the linear interpolation filter. When the linear interpolation filter is used for the current block, it may be determined that the current block satisfies the condition for adaptive weighted prediction.

(i) A coding tool is not used for the current block. For example, an optical flow-based motion vector optimization method is not used for the current block. In this case, it may be determined that the current block satisfies the condition for adaptive weighted prediction. Video coding standards such as AV2 and H.266 allow use of the optical flow-based motion vector optimization method. The method is a method for refining a motion vector through derivation based on an optical flow equation.

(j) A reference frame used for the current block during the compound prediction satisfies a condition. In this case, it may be determined that the current block satisfies the condition for adaptive weighted prediction. The condition includes one or more of the following (the condition may include either or both of (1) and (2)): (1) An orientation relationship between the reference frame used during the compound prediction and the current frame in the video bitstream meets a preset relationship. That the orientation relationship meets a preset relationship includes any one of the following: All used reference frames are located before the current frame; all used reference frames are located after the current frame; or a part of used reference frames are located before the current frame, and remaining reference frames are located after the current frame. The video bitstream includes a plurality of video frames, and any video frame corresponds to frame display time in a video. The orientation relationship may actually be understood as an order of frame display time. For example, that all used reference frames are located before the current frame may be understood as that frame display time of the reference frames is earlier than frame display time of the current frame, and that all used reference frames are located after the current frame may be understood as that frame display time of the reference frames is later than frame display time of the current frame.

(2) An absolute value of a significance difference between reference predicted values corresponding to reference frames used during the compound prediction is greater than or equal to a preset threshold. In this case, it may be determined that the current block satisfies the condition for adaptive weighted prediction. The preset threshold may be set according to a requirement. In some embodiments, significance of the reference predicted values corresponding to the reference frames may be measured by significance metrics. In this case, the significance difference between the reference predicted values corresponding to the reference frames used during the compound prediction may be determined based on the significance metrics of the reference predicted values corresponding to the used reference frames. For example, N=2, and the two reference predicted values during the compound prediction are a reference predicted value 1 corresponding to a reference frame 1 and a reference predicted value 2 corresponding to a reference frame 2 It is assumed that a significance metric of the reference predicted value 1 is D0 and a significance metric of the reference predicted value 2 is D1. In this case, a significance difference between the reference predicted values corresponding to the two reference frames is a difference D0−D1 between the significance metric D0 of the reference predicted value 1 and the significance metric D1 of the reference predicted value 2. For example, an absolute value of the significance difference between the two reference predicted values is as follows: ΔD=abs(D0−D1), where abs( ) indicates to take an absolute value.

The foregoing cases in which the current block satisfies the condition for adaptive weighted prediction may be used alone or in combination. For example, that the current block satisfies the condition for adaptive weighted prediction may include: A sequence header of a frame sequence to which the current block belongs includes a first indication field, and the first indication field indicates that a coding block in the frame sequence allows use of adaptive weighted prediction; and a motion type of the current block is a specified motion type. For another example, a frame header of the current frame to which the current block belongs includes a third indication field, and the third indication field indicates that a coding block in the current frame allows use of adaptive weighted prediction; and a preset motion vector prediction mode is used for the current block. However, the disclosure is not limited thereto. In some embodiments, the decoding device can flexibly configure condition entries in the condition for adaptive weighted prediction, to adapt to different compound prediction scenarios and ensure coding and decoding performance of compound prediction in different scenarios.

302: Determine, for the current block based on significance of the N reference predicted values, a target weight group used for weighted prediction, the significance being configured for representing a degree of impact of a corresponding reference predicted value on decoding performance for the current block.

The significance of the reference predicted values may be determined based on factors such as a bit rate consumed during weighted prediction and quality loss of the current block during coding. For example, if bit rate consumption significantly increases when weighted prediction is performed on the current block by using a reference predicted value, the reference predicted value is not significantly helpful in reducing bit rate consumption, and significance of the reference predicted value is low. For another example, if quality loss significantly increases when weighted prediction is performed on the current block by using a reference predicted value, the reference predicted value is less helpful in reducing quality loss, and significance of the reference predicted value is low. A degree of impact of a reference predicted value on decoding performance for the current block may be determined based on significance of the reference predicted value. The target weight group includes one or more weight values. The weight values affect reference predicted values during weighted prediction. If significance of a reference predicted value is low, the reference predicted value corresponds to a small weight value in the target weight group. If significance of a reference predicted value is high, the reference predicted value corresponds to a large weight value in the target weight group. The target weight group is a group of weights that are selected based on a consideration of impact of each reference predicted value on factors such as bit rate consumption and quality loss and that achieve a low cost (for example, a cost of bit rate consumption, a cost of quality loss, or a cost of bit rate consumption and quality loss) and coding and decoding performance during weighted prediction.

In some embodiments, the video bitstream includes one or more weight lists, each weight list includes one or more weight groups, and each weight group includes one or more weight values. Quantities of weight values included in different weight groups are allowed to be the same or different. Values of weight values included in different weight groups are allowed to be the same or different. Orders of weight values included in different weight groups are allowed to be the same or different. The following is an example of weight lists:

i. A weight list 1 is expressed as {2, 4, 6, 8, 10, 12, 14}/16. This indicates that the weight list 1 includes seven weight groups: a weight group 1: {2}/16; a weight group 2: {4}/16; a weight group 3: {6}/16; . . . ; and a weight group 7: {14}/16.

ii. A weight list 2 is expressed as {14, 8, 4, 12, 2}/16. This indicates that the weight list 2 includes five weight groups: a weight group 1: {14}/16; a weight group 2: {8}/16; . . . ; and a weight group 5: {2}/16.

iii. A weight list 3 is expressed as {4, {8, 8}, 12}/16. This indicates that the weight list 3 includes three weight groups: a weight group 1: {4}/16; a weight group 2: {8, 8}/16; and a weight group 3: {12}/16.

The following can be learned from the foregoing example: (1) Quantities of weight groups included in different weight lists are allowed to be different. For example, a quantity of weight groups in the weight list 1 is 7, a quantity of weight groups in the weight list 2 is 5, and a quantity of weight groups in the weight list 1 is 3. (2) Quantities of weight values included in different weight groups are allowed to be the same. For example, a quantity of weight values included in each weight group in the weight list 1 is 1. (3) Quantities of weight values included in different weight groups are also allowed to be different. For example, a quantity of weight values included in the weight group 1 in the weight list 3 is 1, but a quantity of weight values included in the weight group 2 in the weight list 3 is 2. (4) Weight values in different weight groups are allowed to be the same. For example, the weight group 1 in the weight list 1 includes the weight value 2/16, and the weight group 1 in the weight list 2 also includes the weight value 2/16. (5) Weight values in different weight groups are also allowed to be different. For example, the weight group 1 in the weight list 1 includes the weight value 2/16, but the weight group 2 in the weight List 1 includes the weight value 4/16. A sum of weight values provided by a weight group may be equal to 1. In the foregoing example, although each weight group includes one weight value, the weight value is less than 1. Therefore, each weight group further implicitly includes another weight value. Each weight group may provide two weight values, and a sum of the two weight values is 1. For example, the weight group 1 in the weight list 1 includes the weight value 2/16, but in some embodiments, the weight group 1 provides a total of two weight values: the weight value 2/16 and a weight value 14/16. For another example, the weight group 3 in the weight list 3 includes the weight value 12/16, but in some embodiments, the weight group 3 provides two weight values: the weight value 12/16 and a weight value 4/16. It can be learned that, in some embodiments, when a sum of weight values included in a weight group in a weight list is less than 1, a weight value implicitly included in the weight group may be calculated.

The following is another example of weight lists:

i. A weight list 4 includes four weight groups: a weight group 1: {2, 14}/16; a weight group 2: {4, 12}/16; a weight group 3: {6, 10}/16; and a weight group 4: {8, 8}}/16.

ii. A weight list 5 includes two weight groups: a weight group 1: {4, 12}/16; and a weight group 2: {10, 6}/16.

The following can be learned from the foregoing example: (1) A sum of all weight values included in a weight group in a weight list is equal to 1. (2) Orders of weight values included in different weight groups are allowed to be different. For example, the weight group 3 in the weight list 4 and the weight group 2 in the weight list 5 include same weight values, but orders of the weight values are different.

In some embodiments, operation 302 may include operations 31 and 32.

31: Determine a target weight list from one or more weight lists based on the significance of the N reference predicted values.

When determining the target weight list from the one or more weight lists based on the significance of the N reference predicted values, the decoding device may perform determining based on a quantity of weight lists and a significance metric of each reference predicted value. Some embodiments may include the following methods:

Method 1: When the video bitstream includes one weight list, the decoding device may directly determine the one weight list in the video bitstream as the target weight list.

Method 2: When the video bitstream includes a plurality of weight lists, the decoding device may introduce a significance metric of a reference predicted value, and determine the target weight list from the plurality of weight lists based on significance metrics of the N reference predicted values.

(1) The target weight list is determined based on an absolute value of a difference between the significance metrics of the N reference predicted values.

When a quantity of weight lists in the video bitstream is M+1, M being a positive integer greater than or equal to 1, the M+1 weight lists may be denoted as {w_list1, w_list2, . . . , w_listM+1}, and one weight list corresponds to one threshold range, for example, a quantity of threshold ranges is also M+1. In some embodiments, the decoding device may directly set M+1 threshold ranges according to a requirement. In some embodiments, the decoding device may obtain M thresholds, and obtain, through division, M+1 threshold ranges based on M thresholds. For example, the decoding device obtains M thresholds: T1, T2, . . . , and TM. The decoding device obtains, through division based on the M thresholds, M+1 threshold ranges: [0, T1], (T1, T2], (T2, T3], . . . , and (TM, +∞). [0, T1] may correspond to the w_list1, (T1, T2] may correspond to the w_list2, and so on. T is an integer greater than or equal to 0.

The decoding device may obtain the significance metrics of the N reference predicted values, and calculate a significance difference between the N reference predicted values. A significance difference between any two reference predicted values is measured by a difference between significance metrics of the any two reference predicted values. The decoding device may determine a threshold range to which an absolute value of the significance difference between the N reference predicted values belongs; and determine, as the target weight list, a weight list corresponding to the threshold range to which the absolute value of the significance difference between the N reference predicted values belongs. It is assumed that significance metrics of any two reference predicted values are D0 and D1, and a significance difference between the any two reference predicted values is expressed as D0−D1. In this case, an absolute value of the significance difference between the any two reference predicted values is expressed as ΔD=abs(D0−D1). The significance metric is a metric for measuring a degree of significance, but a measurement criterion may vary in a plurality of cases. For example, the measurement criterion may be as follows: A larger significance metric indicates a higher degree of significance. For another example, the measurement criterion may be as follows: A smaller significance metric indicates a higher degree of significance. However, the measurement criterion is not limited thereto.

In some embodiments, N=2, for example, two reference predicted values are included, and significance metrics of the two reference predicted values are D0 and D1. In this case, the decoding device directly determines, as the target weight list, a weight list corresponding to a threshold range to which ΔD=abs(D0-D1) belongs. For example, when the video bitstream includes two weight lists, the two weight lists are denoted as {w_list1, w_list2}, where the w_list1 is {8, 12, 14}/16, and the w_list2 is {12, 8, 4}/16. It is assumed that a threshold range corresponding to the w_list1 is [0, 1], and a threshold range corresponding to the w_list2 is (1, +00). In this case, when ΔD=abs(D0-D1) is less than or equal to 1 and belongs to the threshold range of [0, 1], the w_list1 is determined as the target weight list. Otherwise, when ΔD=abs(D0−D1) is greater than 1 and belongs to the threshold range of (1, +00), the w_list2 is determined as the target weight list.

In some embodiments, if N>2, the decoding device may separately calculate an absolute value of a significance difference between any two reference predicted values; the decoding device finds a weight list corresponding to a threshold range to which each absolute value belongs; and the decoding device determines, as the target weight list, a weight list corresponding to a largest quantity of absolute values. For example, N=3, and significance metrics of the three reference predicted values are D0, D1, and D2. In this case, the decoding device may separately calculate an absolute value of a significance difference between any two reference predicted values. For example, the decoding device separately calculates ΔD=abs(D0−D1), ΔD'=abs (D1−D2), and ΔD"=abs(D0−D1). The decoding device determines a weight list corresponding to a threshold range to which each of ΔD, ΔD', and ΔD" belongs. If two or more of the three absolute values correspond to a same weight list, the decoding device determines the same weight list as the target weight list.

In some embodiments, if N>2, an absolute value of a significance difference between any two reference predicted values may be separately calculated. The decoding device finds a largest value among absolute values, and the decoding device determines, as the target weight list, a weight list corresponding to a threshold range to which the largest value belongs. For example, in the foregoing example in which N=3, based on calculating ΔD, ΔD', and ΔD", the decoding device finds a largest value among ΔD, ΔD', and ΔD". Assuming that the largest value is ΔD', the decoding device determines, as the target weight list, a weight list corresponding to a threshold range to which ΔD' belongs.

In some embodiments, if N>2, the decoding device may separately calculate an absolute value of a significance difference between any two reference predicted values. The decoding device finds a smallest value among absolute values, and the decoding device determines, as the target weight list, a weight list corresponding to a threshold range to which the smallest value belongs. For example, in the foregoing example in which N=3, based on calculating ΔD, ΔD', and ΔD", the decoding device finds a smallest value among ΔD, ΔD', and ΔD". Assuming that the smallest value is ΔD, the decoding device determines, as the target weight list, a weight list corresponding to a threshold range to which ΔD belongs.

In some embodiments, if N>2, the decoding device may separately calculate an absolute value of a significance difference between any two reference predicted values. The decoding device calculates an average value of absolute values, and the decoding device determines, as the target weight list, a weight list corresponding to a threshold range to which the average value belongs. For example, in the foregoing example in which N=3, based on calculating ΔD, ΔD', and ΔD", the decoding device calculates an average value of ΔD, ΔD', and ΔD" as follows: (ΔD+ΔD'+ΔD")/3. The decoding device determines, as the target weight list, a weight list corresponding to a threshold range to which the average value belongs.

In some embodiments, the target weight list may be determined by using other numerical characteristics of the absolute value of the significance difference between the N reference predicted values, for example, a largest value or a smallest value among squared absolute values, or an average value of the squared absolute values. However, the disclosure is not limited thereto. In some embodiments, the decoding device determines the target weight list based on a threshold range to which a difference between the significance metrics of the N reference predicted values belongs, to determine a weight value for reconstruction of the current block. This helps improve accuracy of prediction for the current block, and therefore can improve coding and decoding performance.

(2) The target weight list is determined through comparison between values of significance metrics of reference predicted values.

The N reference predicted values of the current block may include a first reference predicted value and a second reference predicted value, and the video bitstream may include a first weight list and a second weight list. The decoding device may compare a value of a significance metric of the first reference predicted value with a value of a significance metric of the second reference predicted value. If it is determined that the significance metric of the first reference predicted value is greater than the significance metric of the second reference predicted value, the first weight list is determined as the target weight list. If it is determined that the significance metric of the first reference predicted value is less than or equal to the significance metric of the second reference predicted value, the decoding device determines the second weight list as the target weight list.

For example, the significance metric of the first reference predicted value is D0, the significance metric of the second reference predicted value is D1, the first weight list is w_list1, and the second weight list is w_list2. The decoding device compares a value of D0 with a value of D1. If D0>D1, the decoding device may determine the first weight list w_list1 as the target weight list. If D0≤D1, the decoding device may determine the second weight list w_list2 as the target weight list.

In some embodiments, a weight value in the first weight list is opposite to a weight value in the second weight list. For example, w_list2 [x]=1-w_list1 [x], where x indicates a weight value in a weight list. For example, w_list1={0.2, 0.4}, and w_list2 [x]=1-w_list1[x], for example, w_list2 [x]={0.8, 0.6}. A sum of a weight value in the first weight list and a weight value in the second weight list that are in same positions is 1. In addition, a weight value in the first weight list and a weight value in the second weight list may be set separately.

In some embodiments, the decoding device determines a corresponding weight list as the target weight list for the current block based on a relationship between numerical values of two reference predicted values. This can improve pertinence of the target weight list and help improve accuracy of prediction for the current block, and therefore can improve coding and decoding performance.

(3) The target weight list is determined by using a mathematical sign function and significance metrics of reference predicted values.

The N reference predicted values of the current block include a first reference predicted value and a second reference predicted value, and the video bitstream includes a first weight list, a second weight list, and a third weight list. The decoding device may call the mathematical sign function to process a difference between a significance metric of the first reference predicted value and a significance metric of the second reference predicted value to obtain a sign value. If the sign value is a first preset value (for example, −1), the first weight list is determined as the target weight list. If the sign value is a second preset value (for example, 0), the second weight list is determined as the target weight list. If the sign value is a third preset value (for example, 1), the third weight list is determined as the target weight list. The first weight list, the second weight list, and the third weight list are different weight lists; or two of the first weight list, the second weight list, and the third weight list are allowed to be a same weight list.

The significance metric of the first reference predicted value is D0, and the significance metric of the second reference predicted value is D1. The mathematical sign function is called to process a difference between D0 and D1 to obtain a sign value, for example, the sign value=sign (D0−D1), where sign( ) indicates the mathematical sign function. The decoding device determines a corresponding weight list from three weight lists as the target weight list for the current block based on a relationship between numerical values of two reference predicted values. This can improve pertinence of the target weight list and help improve accuracy of prediction for the current block, and therefore can improve coding and decoding performance.

(4) The foregoing manners (1), (2), and (3) may be used alone, or the manners (1), (2), and (3) may be combined to determine the target weight list. In some embodiments, it is assumed that M+1 weight lists exist. For any two reference predicted values, the decoding device may first use the manner (1) to determine a candidate weight list based on a threshold range to which an absolute value of a significance difference between the two reference predicted values belongs, and use the manner (2) to compare a value of a significance metric of a first reference predicted value with a value of a significance metric of a second reference predicted value. If it is determined that the significance metric of the first reference predicted value is greater than the significance metric of the second reference predicted value, the decoding device directly determines the candidate weight list as the target weight list. If it is determined that the significance metric of the first reference predicted value is less than or equal to the significance metric of the second reference predicted value, the decoding device determines, as the target weight list, a weight list corresponding to a weight value opposite to a weight value in the candidate weight list.

For example, the significance metric of the first reference predicted value is D0, and the significance metric of the second reference predicted value is D1. A candidate weight list w_list1 may be determined in the manner (1). If D0>D1, the decoding device determines the weight list w_list1 as the target weight list. If D0≤D1, the decoding device determines a weight list w_list2 as the target weight list. A weight value in the w_list2 is opposite to a weight value in the w_list1, for example, w_list2 [x]=1-w_list1[x].

In some embodiments, it is assumed that the video bitstream includes 3×(M+1) weight lists, for example, one threshold range may correspond to three weight lists. For any two reference predicted values, the decoding device may first use the manner (1) to determine a threshold range to which an absolute value of a significance difference between a first reference predicted value and a second reference predicted value belongs, and determine three weight lists corresponding to the threshold range as candidate weight lists. For example, the candidate weight lists may include a first weight list, a second weight list, and a third weight list. The decoding device uses the manner (2) to call a mathematical sign function to process a difference between a significance metric of the first reference predicted value and a significance metric of the second reference predicted value to obtain a sign value. If the sign value is a first preset value, the decoding device determines the first weight list as the target weight list. If the sign value is a second preset value, the decoding device determines the second weight list as the target weight list. If the sign value is a third preset value, the decoding device determines the third weight list as the target weight list.

For example, three weight lists {w_list1, w_list2, w_list3} are determined as candidate weight lists in the manner (1), and the mathematical sign function is called to process the difference between the significance metric of the first reference predicted value and the significance metric of the second reference predicted value to obtain the sign value. When the sign value is −1, the decoding device determines the w_list1 as the target weight list. When the sign value is 0, the decoding device determines the w_list2 as the target weight list. When the sign value is 1, the decoding device determines the w_list3 as the target weight list.

Any one of the N reference predicted values is denoted as a reference predicted value i. The reference predicted value i is derived from a reference block i. A video frame to which the reference block i belongs is a reference frame i. i is an integer, and i is less than or equal to N. A video frame to which the current block belongs is a current frame. A significance metric of the reference predicted value i may be determined by using any one of the following methods:

Method 1: The significance metric of the reference predicted value i is calculated based on a picture order count (POC) of the current frame in the video bitstream and a picture order count of the reference frame i in the video bitstream. The decoding device may calculate a difference between the picture order count of the current frame in the video bitstream and the picture order count of the reference frame i in the video bitstream, and use an absolute value of the difference as the significance metric of the reference predicted value i. For example, it is assumed that the picture order count of the current frame in the video bitstream is cur_poc, and the picture order count of the reference frame i in the video bitstream is ref_poc. The significance metric of the reference predicted value i is as follows: D=abs (cur_poc-ref_poc), where abs( ) indicates to take an absolute value.

Method 2: The significance metric of the reference predicted value i is calculated based on a picture order count of the current frame in the video bitstream, and a picture order count and a quality metric Q of the reference frame i in the video bitstream. The quality metric Q may be determined based on a plurality of cases. However, the disclosure is not limited thereto. The quality metric Q of the reference frame i may be derived based on quantization information of the current block. For example, the quality metric Q may be set to a base quantization index (base_qindex) of the reference frame i. base_qindexes of any reference frames may be different or the same. In some embodiments, the quality metric Q of the reference frame i may be derived based on other coding information. For example, the quality metric Q of the reference frame i may be derived based on a coding information difference between a coded CU in the reference frame i and a coded CU in the current frame.

In some embodiments, the decoding device may calculate a difference between the picture order count of the current frame in the video bitstream and the picture order count of the reference frame i in the video bitstream; and determine the significance metric of the reference predicted value i by using an objective function based on the difference, the quality metric Q, and a significance metric list.

The objective function is as follows: D=f(cur_poc-ref_poc)+Q, where D represents the significance metric of the reference predicted value i, f(x) is an increasing function, x=cur_poc-ref_poc, cur_poc represents the picture order count of the current frame in the video bitstream, and ref_poc represents the picture order count of the reference frame i in the video bitstream. The significance metric list includes a correspondence between f (x) and a reference significance metric, as shown in Table 1.

TABLE 1

| x | 0 | 1 | 2 | 3 | 4 | 5 | 6 | 7 | 8 | 9 |
|---|---|---|---|---|---|---|---|---|---|---|
| f(x) | 0 | 64 | 96 | 112 | 120 | 124 | 126 | 127 | 128 | 129 |

The foregoing function expression of f (x) is an example, and the function expression of f (x) is allowed to vary in some embodiments. For example, an expression of f(x) is not limited in some embodiments.

In some embodiments, the significance metric of the reference frame i may be calculated based on the quality metric Q and an orientation relationship between the reference frame i and the current frame. In some embodiments, the decoding device may establish a correspondence between a reference orientation relationship and a reference significance metric. For example, if the reference orientation relationship is that a reference frame is located before the current frame, the reference significance metric may correspond to a first value; or if the reference orientation relationship is that a reference frame is located after the current frame, the reference significance metric may correspond to a second value. The decoding device may calculate the significance metric of the reference predicted value i based on the quality metric Q and a reference significance metric corresponding to the reference frame i.

Method 3: A significance metric score of the reference frame i is calculated based on a calculation result in the method 1 and a calculation result in the method 2, significance metric scores of reference frames corresponding to the N reference predicted values are sort in ascending order, and an index of the reference frame i in the sorting is determined as the significance metric of the reference predicted value i.

In some embodiments, a first significance metric of the reference predicted value i may be calculated by using the method 1, and a second significance metric of the reference predicted value i may be calculated by the method 2. The significance metric score of the reference frame i may be calculated based on the first significance metric and the second significance metric. The significance metric scores of the reference frames corresponding to the N reference predicted values are sort in ascending order, and the index of the reference frame i in the sorting is determined as the significance metric of the reference predicted value i.

For example, a significance metric score of a reference frame 1 corresponding to a reference predicted value 1 is 20, a significance metric score of a reference frame 2 corresponding to a reference predicted value 2 is 30, and a significance metric score of a reference frame 3 corresponding to a reference predicted value 3 is 40. The significance metric scores of the reference frames corresponding to the three reference predicted values are sort in ascending order. A sorting result is as follows: the reference frame 1, the reference frame 2, and the reference frame 3. An index of the reference frame 1 in the sorting is 1, and therefore a significance metric of the reference predicted value 1 is 1. An index of the reference frame 2 in the sorting is 2, and therefore a significance metric of the reference predicted value 2 is 2. An index of the reference frame 3 in the sorting is 3, and therefore a significance metric of the reference predicted value 3 is 3.

The significance metric score of the reference frame i may be calculated based on the first significance metric and the second significance metric in the following manners: ① Weighted summation is performed on the first significance metric and the second significance metric to obtain the significance metric of the reference predicted value i. ② The first significance metric and the second significance metric are averaged to obtain the significance metric of the reference predicted value i.

Method 4: To obtain an accurate significance metric, the decoding device may adjust a calculation result in the method 1, the method 2, or the method 3 based on a prediction mode for the reference predicted value i to obtain the significance metric of the reference predicted value i. The prediction mode for the reference predicted value i includes either of the following: an inter prediction mode and an intra prediction mode. In some embodiments, the calculation result in the method 1, the method 2, or the method 3 may be adjusted based on an adjustment function to obtain the significance metric of the reference predicted value i. For example, the adjustment function may be as follows: D'=g(D) =a×D+b, where D' represents the significance metric of the reference predicted value i, D is the calculation result in the method 1, the method 2, or the method 3, and a and b may be adaptively set based on the prediction mode. The following provides three examples:

(a) If the prediction mode for the reference predicted value i is inter prediction, a=1, and b=0.

(b) If the prediction mode for the reference predicted value i is intra prediction, a=2, and b=0.

(c) If the prediction mode for the reference predicted value i is intra prediction, a=0, and b=160.

In practice, a significance metric of a reference predicted value may be determined by any one of the method 1 to the method 4. However, the disclosure is not limited thereto. The decoding device may determine a significance metric based on various different methods. This can ensure reliability of the significance metric, and therefore help improve accuracy of prediction for the current block and can improve coding and decoding performance.

32: Select, from the target weight list, the target weight group used for weighted prediction.

The decoding device may select the target weight group from the target weight list in the following two cases:

(1) The target weight list includes one weight group. In this case, an index of the target weight group may not be obtained from the video bitstream through decoding, and the weight group in the target weight list is directly used as the target weight group for weighted prediction.

(2) The target weight list includes more than one weight group, for example, the target weight list includes a plurality of weight group. For example, the target weight list is expressed as {{2, 14}, {4, 12}, {6, 10}, {8, 8}}/16, and the target weight list includes four weight groups. In this case, an index of the target weight group during weighted prediction for the current block may be indicated in the video bitstream, and a coding scheme of binary coding by using a truncated unary code or a multi-symbol entropy coding scheme is used for the index of the target weight group. The truncated unary code is used when a maximum value (Max) of a to-be-encoded syntax element is known. It is assumed that a to-be-encoded symbol is x. If 0<x<Max, a unary code is used to binarize x. If x=Max, a binary string obtained by binarizing x includes Is and has a length of Max. The decoding device may obtain, from the video bitstream through decoding, the index of the target weight group used for weighted prediction, and select the target weight group from the target weight list based on the index of the target weight group. The index of the target weight group may indicate a position in the target weight list. For example, the target weight list in the foregoing example includes four weight groups. The decoding device learns, from the video bitstream through decoding, that the index of the target weight group is 2; determines a position in the target weight list based on the index of the target weight group, for example, determines that the target weight group is in a second position in the target weight list (for example, is a weight group 2); and determines that the target weight group is {4, 12}/16. The decoding device may determine the target weight group based on the index obtained from the video bitstream through decoding, and may determine the target weight group correspondingly. This improves processing efficiency of selecting the target weight group, and therefore improves decoding efficiency.

In some embodiments, the decoding device determines the target weight list based on the significance of the N reference predicted values, and selects, from the target weight list, the target weight group used for weighted prediction. A weight list is selected, so that an appropriate weight group can be selected for decoding and reconstructing the current block. This can improve accuracy of prediction for the current block, and therefore improve coding and decoding performance.

303: Perform weighted prediction on the N reference predicted values based on the weight value in the target weight group to obtain a predicted value of the current block, the predicted value of the current block being configured for reconstructing a decoded image corresponding to the current block.

A quantity of weight values provided by the target weight group may correspond to a quantity of reference predicted values. For example, if the quantity of reference predicted values is N, the quantity of weight values actually provided by the target weight group is also N correspondingly. For example, N=3, the three reference predicted values are a reference predicted value 1, a reference predicted value 2, and a reference predicted value 3, and the target weight group may include three weight values: a weight value 1, a weight value 2, and a weight value 3. The reference predicted value 1 corresponds to the weight value 1, the reference predicted value 2 corresponds to the weight value 2, and the reference predicted value 3 corresponds to the weight value 3. In the foregoing example, the target weight group may include two weight values: a weight value 1 and a weight value 2. A sum of the weight value 1 and the weight value 2 is less than 1. In this case, a weight value 3 implicitly included in the target weight group may be further calculated as follows: 1—the weight value 1—the weight value 2.

In some embodiments, weighted prediction may be performed on the N reference predicted values based on a target weight to obtain a predicted value of the current block in the following two manners (1) and (2):

(1) The decoding device may perform weighted summation on the N reference predicted values by using the weight value in the target weight group to obtain the predicted value of the current block. The predicted value P(x, y) of the current block may be as follows:

$$P(x, y) = (w1 \cdot P_0(x, y) + w2 \cdot P_1(x, y) + \cdots + wn \cdot P_{N-1}(x, y)) / N,$$

where

P(x, y) is the predicted value of the current block, $P_0(x, y)$, $P_1(x, y)$, . . . , and $P_{N-1}$ (x, y) represent the N reference predicted values respectively, w1 represents a weight value corresponding to a first reference predicted value that corresponds to the current block (x, y), w2 represents a weight value corresponding to a second reference predicted value that corresponds to the current block (x, y), . . . , and wn represents a weight value corresponding to an $N^{th}$ reference predicted value that corresponds to the current block (x, y).

In some embodiments, when N=2, for example, when two reference predicted values are used for weighted prediction for the current block, the target weight group includes one weight value, for example, includes an implicit weight value, and the predicted value P(x, y) of the current block may be as follows:

$$P(x, y) = (w(x, y) \cdot P_0(x, y) + (1 - w(x, y)) \cdot P_1(x, y)) / 2,$$

P(x, y) is the predicted value of the current block, $P_0(x, y)$ and $P_1(x, y)$ are two reference predicted values corresponding to the current block (x, y), w(x, y) is a weight value that is in the target weight group and that is applied to a first reference predicted value $P_0(x, y)$, and 1−w(x, y) is the implicit weight value, and is applied to a second reference predicted value $P_1(x, y)$.

(2) In video coding, due to complexity of calculation of a predicted value, a right shift operation may be used to replace division to implement integer calculation, and the N reference predicted values are separately weighted based on the weight value in the target weight group through integer calculation to obtain the predicted value of the current block. The integer calculation can reduce complexity of calculation of a predicted value to some extent.

For example, a quantity of reference predicted values is 2 (for example, N=2), and a quantity of weight values in the target weight group is 1. The decoding device may separately weight the two reference predicted values based on the weight value in the target weight group through integer calculation to obtain the predicted value of the current block.

In this case, the predicted value P(x, y) of the current block may be as follows:

$$P(x, y) = (w(x, y) \times P_0(x, y) + (16 - w(x, y)) \times P_1(x, y) + 8) >> 4,$$

">>4" indicates a right shift of 4 bits, for example, data during weighting can be exactly divided by 16 through the right shift of 4 bits, and 8 is an offset added for rounding; $P_0(x, y)$, $P_1(x, y)$, w(x, y), and P(x, y) are all integers; P(x, y) is the predicted value of the current block; $P_0(x, y)$ and $P_1(x, y)$ are two reference predicted values corresponding to the current block (x, y); and w(x, y) is a weight value (for example, the weight value in the target weight group) applied to a first reference predicted value $P_0(x, y)$.

For another example, ">>6" indicates a right shift of 6 bits, for example, data during weighting can be exactly divided by 64 through the right shift of 6 bits, and 32 is an offset added for rounding. In this case, the predicted value P(x, y) of the current block may be as follows:

$$P(x, y) = (w \cdot P_0(x, y) + (64 - w) \cdot P_1(x, y) + 32) >> 6$$

In some embodiments, the decoding device performs weighted summation on the N reference predicted values by using the weight value in the target weight group, or performs weighted summation through integer calculation, to obtain the predicted value of the current block. This can ensure accuracy of the predicted value, and therefore help improve decoding performance for the current block.

In some embodiments, after the predicted value of the current block is obtained, a residual video signal of the current block may be superposed with the predicted value to obtain a reconstructed value of the current block, and the decoded image corresponding to the current block is reconstructed based on the reconstructed value of the current block. The decoded image corresponding to the current block may be used as a reference image for weighted prediction for another coding block. In addition, the decoded image corresponding to the current block may also be configured for reconstructing a current frame of the current block, and finally, a video may be reconstructed based on a plurality of reconstructed video frames.

In some embodiments, the decoding device performs compound prediction on a current block in a video bitstream to obtain N reference predicted values of the current block, the current block being a coding block that is being decoded in the video bitstream, and N being an integer greater than 1; and the decoding device determines, for the current block based on significance of the N reference predicted values, a target weight group used for weighted prediction, and performs weighted prediction on the N reference predicted values based on the target weight group to obtain a predicted value of the current block, the predicted value of the current block being configured for reconstructing a decoded image corresponding to the current block. Compound prediction is used in video decoding, and significance of a reference predicted value is fully considered during the compound prediction. For example, during the compound prediction, an appropriate weight can be adaptively selected for the current block based on significance of reference predicted values to perform weighted prediction. This can improve accuracy of prediction for the current block, and therefore improve coding and decoding performance.

Figure 4:
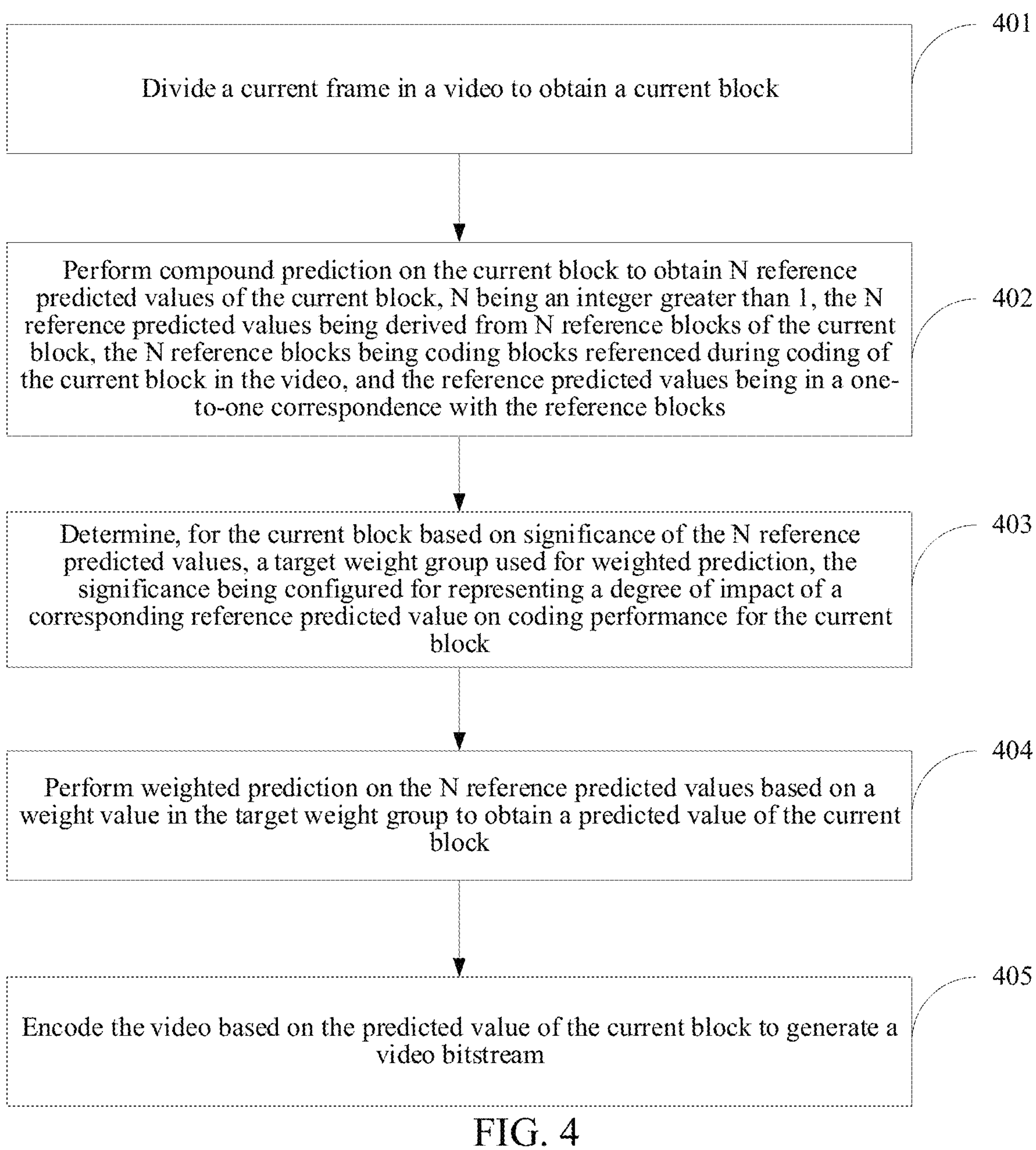
FIG. 4 is a schematic flowchart of a video processing method according to some embodiments.

FIG. 4 is a schematic flowchart of another video processing method according to some embodiments. The video processing method may be performed by the encoding device in the video processing system, and the video processing method described in some embodiments may include the following operations 01 to 05.

01: Divide a current frame in a video to obtain a current block. The current block is a coding block that is in the video and that is being encoded by the encoding device. The video may include one or more video frames, and the current frame is a video frame that is being encoded. The encoding device may divide the current frame in the video to obtain one or more coding blocks, and the current block is any coding block that is being encoded among the one or more coding blocks in the current frame.

02: Perform compound prediction on the current block to obtain N reference predicted values of the current block, N being an integer greater than 1, the N reference predicted values being derived from N reference blocks of the current block, the N reference blocks being coding blocks referenced during coding of the current block in the video, and the reference predicted values being in a one-to-one correspondence with the reference blocks.

The N reference predicted values may be derived from the N reference blocks, and one reference predicted value corresponds to one reference block. In some embodiments, a video frame to which a reference block belongs may be a reference frame, and a video frame to which the current block belongs is a current frame. A positional relationship between the N reference blocks and the current block includes any one of the following: (1) The N reference blocks respectively belong to N reference frames, and the N reference frames and the current frame may be different video frames in the video. (2) The N reference blocks belong to one reference frame, and the reference frame and the current frame may be different video frames in the video. (3) One or more reference blocks of the N reference blocks belong to the current frame, remaining reference blocks of the N reference blocks belong to one or more reference frames, and the one or more reference frames and the current frame are different video frames in the video. (4) The N reference blocks and the current block all belong to the current frame.

Based on the positional relationship between the N reference blocks and the current block in (1) to (4), it can be learned that a prediction mode of compound prediction in some embodiments include an inter prediction mode in which at least two reference frames may be used for inter prediction; may also include a combination prediction mode in which at least one reference frame may be used for inter prediction and the current frame may be used for intra prediction; and further includes an intra prediction mode in which the current frame may be used for intra prediction.

Corresponding to different modes of compound prediction, the encoding device may perform compound prediction on the current block to obtain the N reference predicted values of the current block in any one of the following manners: During compound prediction for the current block, inter prediction is performed on the current block by using the N reference blocks to obtain the N reference predicted values of the current block. In this case, the N reference predicted values of the current block are derived by performing inter prediction by using the N reference blocks of the current block respectively. During compound prediction for the current block, inter prediction is performed on the current block by using at least one of the N reference blocks, and intra prediction is performed by using a remaining reference block in the N reference blocks, to obtain the N reference predicted values. In this case, a part of the N reference predicted values are derived by performing inter prediction by using at least one of the N reference blocks of the current block, and a remaining reference predicted value is derived by performing intra prediction by using a remaining reference block in the N reference blocks.

03: Determine, for the current block based on significance of the N reference predicted values, a target weight group used for weighted prediction, the significance being configured for representing a degree of impact of a corresponding reference predicted value on coding performance for the current block.

The significance of the reference predicted values may be determined based on factors such as a bit rate consumed during weighted prediction and quality loss of the current block during coding. For example, if bit rate consumption significantly increases when weighted prediction is performed on the current block by using a reference predicted value, the reference predicted value is not significantly helpful in reducing bit rate consumption, and significance of the reference predicted value is low. For another example, if quality loss significantly increases when weighted prediction is performed on the current block by using a reference predicted value, the reference predicted value is less helpful in reducing quality loss, and significance of the reference predicted value is low. The target weight group includes one or more weight values. The weight values affect reference predicted values during weighted prediction. If significance of a reference predicted value is low, the reference predicted value corresponds to a small weight value in the target weight group. If significance of a reference predicted value is high, the reference predicted value corresponds to a large weight value in the target weight group. The target weight group is a group of weights that are selected based on a consideration of impact of each reference predicted value on factors such as bit rate consumption and quality loss and that achieve a low cost (for example, a cost of bit rate consumption, a cost of quality loss, or a cost of bit rate consumption and quality loss) and coding and decoding performance during weighted prediction.

In some embodiments, a bit rate consumed by performing, by the encoding device, weighted prediction on the N reference predicted values by using the weight value in the target weight group is less than a preset bit rate threshold; or weighted prediction is performed on the N reference predicted values based on the weight value in the target weight group, so that a quality loss of the current block during coding is less than a preset loss threshold; or a bit rate consumed by performing weighted prediction on the N reference predicted values by using the weight value in the target weight group is less than a preset bit rate threshold, and weighted prediction is performed on the N reference predicted values based on the weight value in the target weight group, so that a quality loss of the current block during coding is less than a preset loss threshold. The preset bit rate threshold and the preset loss threshold may be preset according to an actual requirement. For example, a corresponding bit rate threshold and loss threshold may be statistically analyzed based on a historical coding and decoding record, to reduce the cost of weighted prediction. In some embodiments, the encoding device may set a constraint on selection of the target weight group based on at least one of the preset bit rate threshold and the preset loss threshold, and may select an appropriate target weight group according to an actual requirement. This helps reduce a coding cost and improve coding and decoding performance.

In some embodiments, that one or more weight lists exist during coding may be understood as follows: The one or more weight lists may be used during coding. Each weight list includes one or more weight groups. Each weight group includes one or more weight values. Quantities of weight values included in different weight groups are allowed to be the same or different. Values of weight values included in different weight groups are allowed to be the same or different. In this case, the determining, for the current block based on significance of the N reference predicted values, a target weight group used for weighted prediction may include operations 1 and 2.

1: Determine a target weight list from one or more weight lists based on the significance of the N reference predicted values.

Some embodiments for determining the target weight list from the one or more weight lists based on the significance of the N reference predicted values may include the following methods:

Method 1: When one weight list exists during coding, the weight list may be directly used as the target weight list.

Method 2: When a plurality of weight lists exist during coding, a significance metric of a reference predicted value may be introduced, and the target weight list is determined from the plurality of weight lists based on significance metrics of the N reference predicted values.

(1) The target weight list is determined based on an absolute value of a difference between the significance metrics of the N reference predicted values.

When a quantity of weight lists that exist during coding is M+1, M being a positive integer greater than or equal to 1, one weight list corresponds to one threshold range, for example, a quantity of threshold ranges is also M+1. The encoding device may obtain the significance metrics of the N reference predicted values, and calculate a significance difference between the N reference predicted values. A significance difference between any two reference predicted values is measured by a difference between significance metrics of the any two reference predicted values. A difference between significance metrics of the any two reference predicted values may be calculated, and the difference between the significance metrics of the any two reference predicted values is used as the significance difference between the any two reference predicted values. A threshold range to which an absolute value of the significance difference between the N reference predicted values belongs is determined, and a weight list corresponding to the threshold range to which the absolute value of the significance difference between the N reference predicted values belongs is determined as the target weight list.

(2) The target weight list is determined through comparison between values of significance metrics of reference predicted values.

The N reference predicted values of the current block may include a first reference predicted value and a second reference predicted value, and the weight lists that exist during coding include a first weight list and a second weight list. The encoding device may compare a value of a significance metric of the first reference predicted value with a value of a significance metric of the second reference predicted value. If it is determined that the significance metric of the first reference predicted value is greater than the significance metric of the second reference predicted value, the first weight list is determined as the target weight list. If it is determined that the significance metric of the first reference predicted value is less than or equal to the significance metric of the second reference predicted value, the second weight list is determined as the target weight list.

In some embodiments, a weight value in the first weight list is opposite to a weight value in the second weight list.

(3) The target weight list is determined by using a mathematical sign function and significance metrics of reference predicted values.

The N reference predicted values of the current block include a first reference predicted value and a second reference predicted value, and the weight lists that exist during coding include a first weight list, a second weight list, and a third weight list. The encoding device may call the mathematical sign function to process a difference between a significance metric of the first reference predicted value and a significance metric of the second reference predicted value to obtain a sign value. If the sign value is a first preset value (for example, −1), the first weight list is determined as the target weight list. If the sign value is a second preset value (for example, 0), the second weight list is determined as the target weight list. If the sign value is a third preset value (for example, 1), the third weight list is determined as the target weight list.

(4) The foregoing manners (1), (2), and (3) may be used alone, or the manners (1), (2), and (3) may be combined to determine the target weight list. In some embodiments, it is assumed that M+1 weight lists exist. In the manner (1), a weight list corresponding to a threshold range to which an absolute value of a significance difference belongs may be determined a candidate weight list. The N reference predicted values include a first reference predicted value and a second reference predicted value, and in the manner (2), a value of a significance metric of the first reference predicted value is compared with a value of a significance metric of the second reference predicted value. If it is determined that the significance metric of the first reference predicted value is greater than the significance metric of the second reference predicted value, the candidate weight list is directly determined as the target weight list. If it is determined that the significance metric of the first reference predicted value is less than or equal to the significance metric of the second reference predicted value, a weight list corresponding to a weight value opposite to a weight value in the candidate weight list is determined as the target weight list.

Any one of the N reference predicted values is denoted as a reference predicted value i. The reference predicted value i is derived from a reference block i. A video frame to which the reference block i belongs is a reference frame i. i is an integer, and i is less than or equal to N. A video frame to which the current block belongs is a current frame. A significance metric of the reference predicted value i may be determined by using any one of the following methods:

Method 1: The significance metric of the reference predicted value i is calculated based on a picture order count (POC) of the current frame in the video and a picture order count of the reference frame i in the video. The encoding device may calculate a difference between the picture order count of the current frame in the video and the picture order count of the reference frame i in the video, and use an absolute value of the difference as the significance metric of the reference predicted value i. For example, it is assumed that the picture order count of the current frame in the video is cur_poc, and the picture order count of the reference frame i in the video is ref_poc. The significance metric of the reference predicted value i is as follows: D=abs (cur_poc-ref_poc), where abs( ) indicates to take an absolute value.

Method 2: The significance metric of the reference predicted value i is calculated based on a picture order count of the current frame in the video, and a picture order count and a quality metric Q of the reference frame i in the video. The quality metric Q may be determined based on a plurality of cases. However, the disclosure is not limited thereto. The quality metric Q of the reference frame i may be derived based on quantization information of the current block. For example, the quality metric Q may be set to a base quantization index (base_qindex) of the reference frame i. base_qindexes of any reference frames may be different or the same. In some embodiments, the quality metric Q of the reference frame i may be derived based on other coding information. For example, the quality metric Q of the reference frame i may be derived based on a coding information difference between a coded CU in the reference frame i and a coded CU in the current frame.

In some embodiments, the encoding device may calculate a difference between the picture order count of the current frame in the video and the picture order count of the reference frame i in the video; and determine the significance metric of the reference predicted value i by using an objective function based on the difference, the quality metric Q, and a significance metric list.

In some embodiments, the significance metric of the reference frame i may be calculated based on the quality metric Q and an orientation relationship between the reference frame i and the current frame. In some embodiments, a correspondence between a reference orientation relationship and a reference significance metric may be established. For example, if the reference orientation relationship is that a reference frame is located before the current frame, the reference significance metric may correspond to a first value; or if the reference orientation relationship is that a reference frame is located after the current frame, the reference significance metric may correspond to a second value. The encoding device may calculate the significance metric of the reference predicted value i based on the quality metric Q and a reference significance metric corresponding to the reference frame i.

Method 3: A significance metric score of the reference frame i is calculated based on a calculation result in the method 1 and a calculation result in the method 2, significance metric scores of reference frames corresponding to the N reference predicted values are sort in ascending order, and an index of the reference frame i in the sorting is determined as the significance metric of the reference predicted value i.

In some embodiments, a first significance metric of the reference predicted value i may be calculated by using the method 1, and a second significance metric of the reference predicted value i may be calculated by the method 2. The significance metric score of the reference frame i may be calculated based on the first significance metric and the second significance metric. The significance metric scores of the reference frames corresponding to the N reference predicted values are sort in ascending order, and the index of the reference frame i in the sorting is determined as the significance metric of the reference predicted value i.

The significance metric score of the reference frame i may be calculated based on the first significance metric and the second significance metric in the following manners: (1) Weighted summation is performed on the first significance metric and the second significance metric to obtain the significance metric of the reference predicted value i. (2) The first significance metric and the second significance metric are averaged to obtain the significance metric of the reference predicted value i.

Method 4: To obtain an accurate significance metric, a calculation result in the method 1, the method 2, or the method 3 may be adjusted based on a prediction mode for the reference predicted value i to obtain the significance metric of the reference predicted value i. The prediction mode for the reference predicted value i includes either of the following: an inter prediction mode and an intra prediction mode.

In practice, a significance metric of a reference predicted value may be determined by any one of the method 1 to the method 4. However, the disclosure is not limited thereto.

2: Select, from the target weight list, the target weight group used for weighted prediction.

For example, the target weight list includes one or more weight groups.

(1) The target weight list includes one weight group. In this case, the weight group in the target weight list is directly used as the target weight group for weighted prediction.

(2) The target weight list includes a plurality of weight groups, and the target weight group used for weighted prediction is selected from the target weight list.

During weighted prediction, bit rate consumption may occur, and quality loss of a coding block may also occur during coding. Therefore, the encoding device may first obtain coding performance of weighted prediction performed on the N reference predicted values by using each weight group in the target weight list, and determine a weight group based on coding performance in the target weight list as the target weight group. In some embodiments, a bit rate consumed by performing weighted prediction on the N reference predicted values by using the weight value in the target weight group is a smallest one among consumed bit rates corresponding to all weight groups in the target weight list; or when weighted prediction is performed on the N reference predicted values based on the weight value in the target weight group, quality loss of the current block during coding is a smallest one of quality loss corresponding to all weight groups in the target weight list; or a bit rate consumed by performing weighted prediction on the N reference predicted values by using the weight value in the target weight group is a smallest one among consumed bit rates corresponding to all weight groups in the target weight list, and when weighted prediction is performed on the N reference predicted values based on the weight value in the target weight group, quality loss of the current block during coding is a smallest one of quality loss corresponding to all weight groups in the target weight list. The encoding device may determine a weight group based on coding performance as the target weight group. Coding performance can be achieved when the current block is encoded based on the target weight group, so that video coding performance is improved.

When selecting a target weight group for weighted prediction, an encoder side may continuously try weight groups in the target weight list to obtain the target weight group used for weighted prediction. On a decoder side, continuous tries may or may not be used, and an index of a used target weight group is indicated in a video bitstream. The decoder side may obtain the index of the target weight group from the video bitstream through decoding, and find the target weight group from the target weight list based on the index of the target weight group. The encoding device determines the target weight list based on the significance of the N reference predicted values, and selects, from the target weight list, the target weight group used for weighted prediction. A weight list is selected, so that an appropriate weight group can be selected for reconstructing the current block. This can improve accuracy of prediction for the current block, and therefore improve coding performance.

04: Perform weighted prediction on the N reference predicted values based on the weight value in the target weight group to obtain a predicted value of the current block.

For a implementation of operation 04, according to some embodiments, refer to operation 303.

05: Encode the video based on the predicted value of the current block to generate a video bitstream. The encoding device may encode the video based on the predicted value of the current block and the index of the target weight group to generate the video bitstream. For details about encoding the video based on the predicted value of the current block and the index of the target weight group to generate the video bitstream, refer to the foregoing corresponding descriptions of coding.

In some embodiments, the encoding device divides a current frame in a video to obtain a current block, the current block being a coding block that is being encoded in the video; performs compound prediction on the current block to obtain N reference predicted values of the current block; determines, for the current block based on significance of the N reference predicted values, a target weight group used for weighted prediction; performs weighted prediction on the N reference predicted values based on the target weight group to obtain a predicted value of the current block; and encodes the video based on the predicted value of the current block to generate a video bitstream. Compound prediction is used in video coding, and significance of a reference predicted value is derived during the compound prediction. For example, during the compound prediction, an appropriate weight can be adaptively selected for the current block based on significance of reference predicted values to perform weighted prediction. This can improve accuracy of prediction for the current block, and therefore improve coding and decoding performance.

Figure 5:
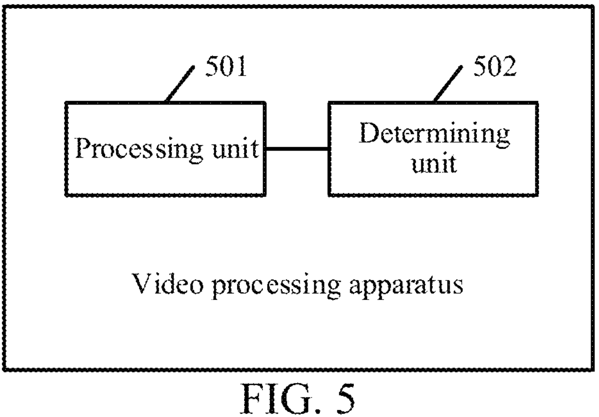
FIG. 5 is a schematic structural diagram of a video processing apparatus according to some embodiments.

FIG. 5 is a schematic structural diagram of a video processing apparatus according to some embodiments. The video processing apparatus may be disposed in a computer device provided in some embodiments. The computer device may be the decoding device mentioned in the method according to some embodiments. The video processing apparatus shown in FIG. 5 may be a computer-readable instruction (including program code) running on the computer device, and the video processing apparatus may be configured to perform some or all of the operations in the method according to some embodiments as shown in FIG. 3. As shown in FIG. 5, the video processing apparatus may include the following units:

a processing unit 501, configured to perform compound prediction on a current block in a video bitstream to obtain N reference predicted values of the current block, N being an integer greater than 1, the current block being a to-be-decoded coding block in the video bitstream, the N reference predicted values being derived from N reference blocks of the current block, the N reference blocks being coding blocks referenced during decoding of the current block in the video bitstream, and the reference predicted values being in a one-to-one correspondence with the reference blocks; and a determining unit 502, configured to determine, for the current block based on significance of the N reference predicted values, a target weight group used for weighted prediction, the target weight group including one or more weight values, the significance being configured for representing a degree of impact of a corresponding reference predicted value on decoding performance for the current block, and the processing unit 501 being further configured to perform weighted prediction on the N reference predicted values based on the weight value in the target weight group to obtain a predicted value of the current block, the predicted value of the current block being configured for reconstructing a decoded image corresponding to the current block.

In some embodiments, a video frame to which a reference block belongs is a reference frame, and a video frame to which the current block belongs is a current frame. A positional relationship between the N reference blocks and the current block includes any one of the following: The N reference blocks respectively belong to N reference frames, and the N reference frames and the current frame are different video frames in a video bitstream; the N reference blocks belong to one reference frame, and the reference frame and the current frame are different video frames in a video bitstream; one or more reference blocks of the N reference blocks belong to the current frame, remaining reference blocks of the N reference blocks belong to one or more reference frames, and the one or more reference frames and the current frame are different video frames in the video bitstream; and the N reference blocks and the current block all belong to the current frame.

In some embodiments, the processing unit 501 is further configured to: determine a condition for adaptive weighted prediction; and if the current block satisfies the condition for adaptive weighted prediction, determine, for the current block based on significance of the N reference predicted values, a target weight group used for weighted prediction.

In some embodiments, that the current block satisfies the condition for adaptive weighted prediction includes at least one of the following: A sequence header of a frame sequence to which the current block belongs includes a first indication field, and the first indication field indicates that coding blocks in the frame sequence allow use of adaptive weighted prediction, the frame sequence being a sequence including video frames in the video bitstream; a slice header of a current slice to which the current block belongs includes a second indication field, and the second indication field indicates that a coding block in the current slice allows use of adaptive weighted prediction, the current slice being an image fragment to which the current block belongs, and the image slice being obtained by dividing a current frame to which the current block belongs; a frame header of a current frame to which the current block belongs includes a third indication field, and the third indication field indicates that a coding block in the current frame allows use of adaptive weighted prediction; during the compound prediction, at least two reference frames are used for inter prediction for the current block; during the compound prediction, at least one reference frame is used for inter prediction for the current block, and the current frame is used for intra prediction; a motion type of the current block is a specified motion type; a preset motion vector prediction mode is used for the current block; a preset interpolation filter is used for the current block; a coding tool is not used for the current block; and a reference frame used for the current block during the compound prediction satisfies a condition, the condition including one or more of the following: an orientation relationship between the used reference frame and the current frame in the video bitstream meets a preset relationship, or an absolute value of a significance difference between reference predicted values corresponding to used reference frames is greater than or equal to a preset threshold, that the orientation relationship meets a preset relationship including any one of the following: All used reference frames are located before the current frame; all used reference frames are located after the current frame; or a part of used reference frames are located before the current frame, and remaining reference frames are located after the current frame.

In some embodiments, the video bitstream includes one or more weight lists, each weight list includes one or more weight groups, each weight group includes one or more weight values, quantities of weight values in different weight groups are allowed to be the same or different, and values of weight values included in different weight groups are allowed to be the same or different. The determining unit 502 may be configured to:

determine a target weight list from one or more weight lists based on the significance of the N reference predicted values; and select, from the target weight list, the target weight group used for weighted prediction.

In some embodiments, a quantity of weight lists in the video bitstream is M+1, one weight list corresponds to one threshold range, and M is a positive integer greater than or equal to 1. The determining unit 502 may be configured to: obtain significance metrics of the N reference predicted values, and calculate a significance difference between the N reference predicted values, a significance difference between any two reference predicted values being measured by a difference between significance metrics of the any two reference predicted values; determine a threshold range to which an absolute value of the significance difference between the N reference predicted values belongs; and determine, as the target weight list, a weight list corresponding to the threshold range to which the absolute value of the significance difference between the N reference predicted values belongs.

In some embodiments, the N reference predicted values of the current block include a first reference predicted value and a second reference predicted value, and the video bitstream includes a first weight list and a second weight list. The determining unit 502 may be configured to: compare a value of a significance metric of the first reference predicted value with a value of a significance metric of the second reference predicted value; if the significance metric of the first reference predicted value is greater than the significance metric of the second reference predicted value, determine the first weight list as the target weight list; and if the significance metric of the first reference predicted value is less than or equal to the significance metric of the second reference predicted value, determine the second weight list as the target weight list, a sum of a weight value in the first weight list and a weight value in the second weight list that are in same positions being 1.

In some embodiments, the N reference predicted values of the current block include a first reference predicted value and a second reference predicted value, and the video bitstream includes a first weight list, a second weight list, and a third weight list. The determining unit 502 may be configured to: call a mathematical symbol function to process a difference between a significance metric of the first reference predicted value and a significance metric of the second reference predicted value to obtain a symbol value; if the sign value is a first preset value, determine the first weight list as the target weight list; if the sign value is a second preset value, determine the second weight list as the target weight list; and if the sign value is a third preset value, determine the third weight list as the target weight list, the first weight list, the second weight list, and the third weight list being different weight lists; or two of the first weight list, the second weight list, and the third weight list being allowed to be a same weight list.

In some embodiments, any one of the N reference predicted values is denoted as a reference predicted value i, the reference predicted value i is derived from a reference block i, and a video frame to which the reference block i belongs is a reference frame i. i is an integer, and i is less than or equal to N. A video frame to which the current block belongs is a current frame. A significance metric of the reference predicted value i is determined by using any one of the following methods: method 1: being calculated based on a picture order count of the current frame in the video bitstream and a picture order count of the reference frame i in the video bitstream; method 2: being calculated based on a picture order count and a quality metric Q of the reference frame i in the video bitstream and a picture order count of the current frame in the video bitstream; method 3: calculating a significance metric score of the reference frame i based on a calculation result in the method 1 and a calculation result in the method 2, sorting significance metric scores of reference frames corresponding to the N reference predicted values in ascending order, and determining an index of the reference frame i in the sorting as the significance metric of the reference predicted value i; and method 4: adjusting a calculation result in the method 1, the method 2, or the method 3 based on a prediction mode for the reference predicted value i to obtain the significance metric of the reference predicted value i, the prediction mode for the reference predicted value i including either of the following: an inter prediction mode and an intra prediction mode.

In some embodiments, a quantity of weight groups included in the target weight list is greater than 1. The determining unit 502 may be configured to: obtain, from the video bitstream through decoding, an index of the target weight group used for weighted prediction; and select the target weight group from the target weight list based on the index of the target weight group, a coding scheme of binary coding by using a truncated unary code or a multi-symbol entropy coding scheme being used for the index of the target weight group.

In some embodiments, the processing unit 501 may be configured to: perform weighted summation on the N reference predicted values by using the weight value in the target weight group to obtain the predicted value of the current block; or separately weight the N reference predicted values based on the weight value in the target weight group through integer calculation to obtain the predicted value of the current block.

In some embodiments, compound prediction is performed on a current block in a video bitstream to obtain N reference predicted values of the current block, the current block being a coding block that is being decoded in the video bitstream; a target weight group used for weighted prediction is adaptively selected for the current block based on significance of the N reference predicted values; and weighted prediction is performed on the N reference predicted values based on the target weight group to obtain a predicted value of the current block, the predicted value of the current block being configured for reconstructing a decoded image corresponding to the current block. Compound prediction is used in video decoding, and significance of a reference predicted value is fully considered during the compound prediction. For example, during the compound prediction, an appropriate weight can be determined for the current block based on significance of reference predicted values to perform weighted prediction. This can improve accuracy of prediction for the current block, and therefore improve coding and decoding performance.

Figure 6:
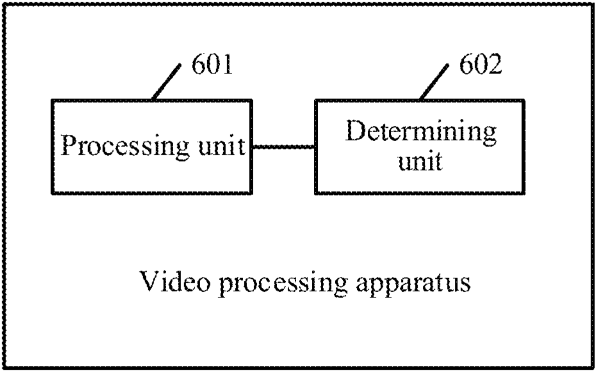
FIG. 6 is a schematic structural diagram of a video processing apparatus according to some embodiments.

FIG. 6 is a schematic structural diagram of a video processing apparatus according to some embodiments. The video processing apparatus may be disposed in a computer device provided in some embodiments. The computer device may be the encoding device mentioned in the method according to some embodiments. The video processing apparatus shown in FIG. 6 may be a computer-readable instruction (including program code) running on the computer device, and the video processing apparatus may be configured to perform some or all of the operations in the method according to some embodiments as shown in FIG. 4. As shown in FIG. 6, the video processing apparatus may include the following units:

a processing unit 601, configured to divide a current frame in a video to obtain a current block, the processing unit 601 being further configured to perform compound prediction on the current block to obtain N reference predicted values of the current block, N being an integer greater than 1, the N reference predicted values being derived from N reference blocks of the current block, the N reference blocks being coding blocks referenced during coding of the current block in the video, and the reference predicted values being in a one-to-one correspondence with the reference blocks; and a determining unit 602, configured to determine, for the current block based on significance of the N reference predicted values, a target weight group used for weighted prediction, the target weight group including one or more weight values, the significance being configured for representing a degree of impact of a corresponding reference predicted value on coding performance for the current block, the processing unit 601 being further configured to perform weighted prediction on the N reference predicted values based on the weight value in the target weight group to obtain a predicted value of the current block, the predicted value of the current block being configured for reconstructing a decoded image corresponding to the current block, and the processing unit 601 being further configured to encode the video based on the predicted value of the current block to generate a video bitstream.

In some embodiments, the determining unit 602 may be configured to: determine a target weight list from one or more weight lists based on the significance of the N reference predicted values, each weight list including one or more weight groups, each weight group including one or more weight values, quantities of weight values included in different weight groups being allowed to be the same or different, and values of weight values included in different weight groups being allowed to be the same or different; and select, from the target weight list, the target weight group used for weighted prediction.

According to some embodiments, each unit may exist respectively or be combined into one or more units. Some units may be further split into multiple smaller function subunits, thereby implementing the same operations without affecting the technical effects of some embodiments. The units are divided based on logical functions. In actual applications, a function of one unit may be realized by multiple units, or functions of multiple units may be realized by one unit. In some embodiments, the apparatus may further include other units. In actual applications, these functions may also be realized cooperatively by the other units, and may be realized cooperatively by multiple units.

A person skilled in the art would understand that these "units" could be implemented by hardware logic, a processor or processors executing computer software code, or a combination of both. The "units" may also be implemented in software stored in a memory of a computer or a non-transitory computer-readable medium, where the instructions of each unit are executable by a processor to thereby cause the processor to perform the respective operations of the corresponding unit.

In some embodiments, a bit rate consumed by performing weighted prediction on the N reference predicted values by using the weight value in the target weight group is less than a preset bit rate threshold; or weighted prediction is performed on the N reference predicted values based on the weight value in the target weight group, so that a quality loss of the current block during coding is less than a preset loss threshold; or a bit rate consumed by performing weighted prediction on the N reference predicted values by using the weight value in the target weight group is less than a preset bit rate threshold, and weighted prediction is performed on the N reference predicted values based on the weight value in the target weight group, so that a quality loss of the current block during coding is less than a preset loss threshold.

In some embodiments, the target weight group is a weight group based on coding performance in the target weight list. The coding performance may include: A bit rate consumed by performing weighted prediction on the N reference predicted values by using the weight value in the target weight group is a smallest one among consumed bit rates corresponding to all weight groups in the target weight list; or when weighted prediction is performed on the N reference predicted values based on the weight value in the target weight group, quality loss of the current block during coding is a smallest one of quality loss corresponding to all weight groups in the target weight list; or a bit rate consumed by performing weighted prediction on the N reference predicted values by using the weight value in the target weight group is a smallest one among consumed bit rates corresponding to all weight groups in the target weight list, and when weighted prediction is performed on the N reference predicted values based on the weight value in the target weight group, quality loss of the current block during coding is a smallest one of quality loss corresponding to all weight groups in the target weight list.

In some embodiments, a current frame in a video is divided to obtain a current block, the current block being a coding block that is being encoded in the video; compound prediction is performed on the current block to obtain N reference predicted values of the current block; a target weight group used for weighted prediction is determined for the current block based on significance of the N reference predicted values; weighted prediction is performed on the N reference predicted values based on the target weight group to obtain a predicted value of the current block; and the video is encoded based on the predicted value of the current block to generate a video bitstream. Compound prediction is used in video coding, and significance of a reference predicted value is fully considered. For example, during the compound prediction, an appropriate weight can be determined for the current block based on significance of reference predicted values to perform weighted prediction. This can improve accuracy of prediction for the current block, and therefore improve coding and decoding performance.

Figure 7:
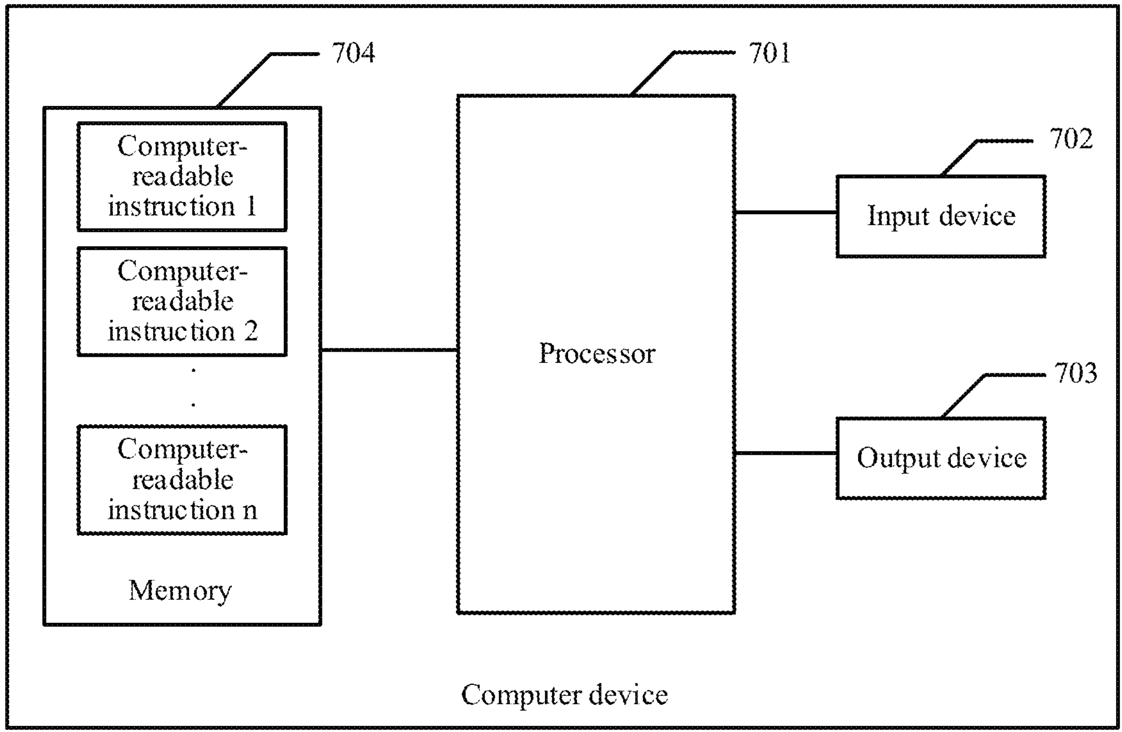
FIG. 7 is a schematic structural diagram of a computer device according to some embodiments.

Further, some embodiments provide a schematic structural diagram of a computer device. The schematic structural diagram of the computer device is shown in FIG. 7. The computer device may be the foregoing encoding device or decoding device. The computer device may include a processor 701, an input device 702, an output device 703, and a memory 704. The processor 701, the input device 702, the output device 703, and the memory 704 are connected through a bus. The memory 704 is configured to store computer-readable instructions. The computer-readable instructions include a program. The processor 701 is configured to execute the program instructions stored in the memory 704.

When the computer device is the decoding device, in some embodiments, the processor 701 runs executable program code in the memory 704 to perform the operations of the decoding-related video processing method performed by the decoding device.

In some embodiments, when the computer device is the encoding device, in some embodiments, the processor 701 runs executable program code in the memory 704 to perform the operations of the encoding-related video processing method performed by the encoding device.

Some embodiments further provides a computer-readable storage medium, the computer-readable storage medium stores computer-readable instructions, and the computer-readable instructions include program instructions. When executing the program instructions, a processor can perform the method according to some embodiments as shown in FIG. 3 and FIG. 4. Reference may also be made to the descriptions of the method according to some embodiments. In an example, the program instructions may be deployed on one computer device, or may be executed on a plurality of computer devices in one location, or may be executed on a plurality of computer devices that are distributed in a plurality of locations and that are interconnected through a communication network.

According to some embodiments, a computer program product is provided. The computer program product includes computer-readable instructions, and the computer-readable instructions are stored in a computer-readable storage medium. A processor of a computer device reads the computer-readable instructions from the computer-readable storage medium, and the processor executes the computer-readable instructions, so that the computer device can perform the method according to some embodiments as shown in FIG. 3 and FIG. 4. A person of ordinary skill in the art can understand that all or some of the processes of the methods in the foregoing embodiments may be implemented by computer-readable instructions instructing relevant hardware. The computer-readable instructions may be stored in a computer-readable storage medium. When the program is executed, the processes in the method according to some embodiments may be included. The storage medium may be a magnetic disk, an optical disc, a read-only memory (ROM), a random access memory (RAM), or the like.

The foregoing embodiments are used for describing, instead of limiting the technical solutions of the disclosure.

A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A video processing method, performed by a computer device comprising:

acquiring a video bitstream;

performing compound prediction on a current block to be decoded in the video bitstream;

based on the current block satisfying a first condition for adaptive weighted prediction, determining, for the current block based on significance of one or more first reference predicted values derived from one or more reference blocks of the current block, a target weight group comprising one or more first weight values, and the significance indicating a degree of impact of a corresponding reference predicted value on decoding performance for the current block;

performing weighted prediction on the one or more first reference predicted values based on the one or more first weight values to obtain a predicted value of the current block; and reconstructing a decoded image corresponding to the current block based on the predicted value, wherein the one or more reference blocks are coding blocks referenced during decoding of the current block in the video bitstream, and wherein the one or more first reference predicted values are in a one-to-one correspondence with the one or more reference blocks.

2. The method according to claim 1, wherein a first video frame to which a reference block belongs is a reference frame, and a second video frame to which the current block belongs is a current frame, and wherein a positional relationship between the one or more reference blocks and the current block comprises:

the one or more reference blocks respectively belong to one or more first reference frames, and the one or more first reference frames and the current frame are different video frames in the video bitstream;

the one or more reference blocks belong to one reference frame, and the reference frame and the current frame are different video frames in the video bitstream;

one or more first reference blocks of the one or more reference blocks belong to the current frame, remaining reference blocks of the one or more reference blocks belong to one or more second reference frames, and the one or more second reference frames and the current frame are different video frames in the video bitstream; or the one or more reference blocks and the current block belong to the current frame.

3. The method according to claim 1, wherein the current block satisfies the first condition based on at least one of:

a sequence header of a frame sequence to which the current block belongs comprising a first field indicating a first coding block in the frame sequence allows use of adaptive weighted prediction, the frame sequence being a sequence comprising video frames in the video bitstream;

a slice header of a current slice to which the current block belongs comprising a second field indicating a second coding block in the current slice allows use of adaptive weighted prediction, the current slice being an image fragment to which the current block belongs, and the current slice being obtained by dividing a current frame to which the current block belongs;

a frame header of the current frame comprising a third field indicating a third coding block in the current frame allows use of adaptive weighted prediction;

in the performing the compound prediction, at least two reference frames being used for inter prediction for the current block;

in the performing the compound prediction, at least one reference frame being used for inter prediction for the current block, and the current frame being used for intra prediction;

a motion type of the current block being a specified motion type;

a preset motion vector prediction mode being used for the current block;

a preset interpolation filter being used for the current block;

a coding tool not being used for the current block; or a reference frame used for the current block in the performing the compound prediction satisfying a second condition, the second condition comprising at least one of:

an orientation relationship between a used reference frame and the current frame in the video bitstream satisfying a preset relationship, or an absolute value of a significance difference between one or more second reference predicted values corresponding to one or more used reference frames being greater than or equal to a preset threshold, wherein the orientation relationship satisfying the preset relationship comprises:

all used reference frames being located before the current frame;

all of the used reference frames being located after the current frame; or one or more of the used reference frames being located before the current frame, and remaining reference frames being located after the current frame.

4. The method according to claim 1, wherein the video bitstream comprises one or more weight lists comprising one or more weight groups, wherein the one or more weight groups comprise one or more second weight values, wherein quantities of the one or more second weight values in different weight groups are allowed to be the same or different, and values of the one or more second weight values in different weight groups are allowed to be the same or different, and wherein the determining the target weight group comprises:

determining a target weight list from the one or more weight lists based on the significance of the one or more first reference predicted values; and selecting, from the target weight list, the target weight group.

5. The method according to claim 4, wherein a quantity of the one or more weight lists is two or more, wherein one weight list of the one or more weight lists corresponds to one threshold range, and wherein the determining the target weight list comprises:

obtaining one or more significance metrics of the one or more first reference predicted values;

calculating a significance difference between the one or more first reference predicted values, the significance difference being measured by a difference between:

a first significance metric of a first value of the one or more first reference predicted values, and a second significance metric of a second value of the one or more first reference predicted values;

determining a threshold range to which an absolute value of the significance difference belongs; and determining, as the target weight list, a weight list corresponding to the threshold range.

6. The method according to claim 4, wherein the one or more first reference predicted values comprise a first value and a second value, and the video bitstream comprises a first weight list and a second weight list, and wherein the determining the target weight list comprises:

comparing a third value of a first significance metric of the first value with a fourth value of a second significance metric of the second value;

based on the third value being greater than the fourth value, determining the first weight list as the target weight list; and based on the third value being less than or equal to the fourth value, determining the second weight list as the target weight list, and wherein a sum of a first weight value in the first weight list and a second weight value in the second weight list in a corresponding position is 1.

7. The method according to claim 4, wherein the one or more first reference predicted values comprise a first value and a second value, and the video bitstream comprises a first weight list, a second weight list, and a third weight list, wherein the determining the target weight list comprises:

obtaining a sign value of a difference between a third value of a first significance metric of the first value and a fourth value of a second significance metric of the second value;

based on the sign value being a first preset value, determining the first weight list as the target weight list;

based on the sign value being a second preset value, determining the second weight list as the target weight list; and based on the sign value being a third preset value, determining the third weight list as the target weight list, and wherein the first weight list, the second weight list, and the third weight list are different weight lists; or two of the first weight list, the second weight list, and the third weight list are allowed to be a same weight list.

8. The method according to claim 5, wherein any one of the one or more first reference predicted values is denoted as value i, wherein the value i is derived from a reference block i, wherein a first video frame to which the reference block i belongs is a reference frame i in the video bitstream, wherein i is an integer less than or equal to a quantity of the one or more first reference predicted values, wherein a second video frame to which the current block belongs is a current frame in the video bitstream, wherein the obtaining the one or more significance metrics comprises determining a third significance metric of the value i, wherein the determining the third significance metric comprises:

determining a fourth significance metric based on a first picture order count of the current frame and a second picture order count of the reference frame i;

determining a fifth significance metric based on the second picture order count, a quality metric of the reference frame i, and the first picture order count, the quality metric being determined based on quantization information of the current block or coding information of the reference frame i;

determining a sixth significance metric based on calculating the fourth significance metric and the fifth significance metric, sorting significance metric values of one or more reference frames corresponding to the one or more first reference predicted values in ascending order, and determining an index of the reference frame i in the sorting as the sixth significance metric; or adjusting a calculation result in the fourth significance metric, the fifth significance metric, or the sixth significance metric based on a prediction mode for the value i to obtain the significance metric of the value i, and wherein the prediction mode comprises an inter prediction mode or an intra prediction mode.

9. The method according to claim 4, wherein a quantity of weight groups in the target weight list is greater than 1, the selecting the target weight group comprises:

obtaining, from the video bitstream through decoding, an index of the target weight group used for weighted prediction; and selecting the target weight group from the target weight list based on the index of the target weight group, wherein a coding scheme of binary coding based on a truncated unary code or a multi-symbol entropy coding scheme is used for the index of the target weight group.

10. A video processing apparatus, comprising:

at least one memory configured to store computer program code; and at least one processor configured to read the program code and operate as instructed by the program code, the program code comprising:

acquiring code configured to cause at least one of the at least one processor to acquire a video bitstream;

first processing code configured to cause at least one of the at least one processor to perform compound prediction on a current block to be decoded in the video bitstream;

first determining code configured to cause at least one of the at least one processor to, based on the current block satisfying a first condition for adaptive weighted prediction, determine, for the current block based on significance of one or more first reference predicted values derived from one or more reference blocks of the current block, a target weight group comprising one or more first weight values, the significance indicating a degree of impact of a corresponding reference predicted value on decoding performance for the current block;

second processing code configured to cause at least one of the at least one processor to perform weighted prediction on the one or more first reference predicted values based on the one or more first weight values to obtain a predicted value of the current block; and reconstructing code configured to cause at least one of the at least one processor to reconstruct a decoded image corresponding to the current block based on the predicted value, wherein the one or more reference blocks are coding blocks referenced during decoding of the current block in the video bitstream, and wherein the one or more first reference predicted values are in a one-to-one correspondence with the one or more reference blocks.

11. The apparatus according to claim 10, wherein a first video frame to which a reference block belongs is a reference frame, and a second video frame to which the current block belongs is a current frame, and wherein a positional relationship between the one or more reference blocks and the current block comprises:

the one or more reference blocks respectively belong to one or more first reference frames, and the one or more first reference frames and the current frame are different video frames in the video bitstream;

the one or more reference blocks belong to one reference frame, and the reference frame and the current frame are different video frames in the video bitstream;

one or more first reference blocks of the one or more reference blocks belong to the current frame, remaining reference blocks of the one or more reference blocks belong to one or more second reference frames, and the one or more second reference frames and the current frame are different video frames in the video bitstream; or the one or more reference blocks and the current block belong to the current frame.

12. The apparatus according to claim 10, wherein the current block satisfies the first condition based on at least one of:

a sequence header of a frame sequence to which the current block belongs comprising a first field indicating a first coding block in the frame sequence allows use of adaptive weighted prediction, the frame sequence being a sequence comprising video frames in the video bitstream;

a slice header of a current slice to which the current block belongs comprising a second field indicating a second coding block in the current slice allows use of adaptive weighted prediction, the current slice being an image fragment to which the current block belongs, and the current slice being obtained by dividing a current frame to which the current block belongs;

a frame header of the current frame comprising a third field indicating a third coding block in the current frame allows use of adaptive weighted prediction;

in the first processing code, at least two reference frames being used for inter prediction for the current block;

in the first processing code, at least one reference frame being used for inter prediction for the current block, and the current frame being used for intra prediction;

a motion type of the current block being a specified motion type;

a preset motion vector prediction mode being used for the current block;

a preset interpolation filter being used for the current block;

a coding tool not being used for the current block; or a reference frame used for the current block in the first processing code satisfying a second condition, the second condition comprising at least one of:

an orientation relationship between a used reference frame and the current frame in the video bitstream satisfying a preset relationship, or an absolute value of a significance difference between one or more second reference predicted values corresponding to one or more used reference frames being greater than or equal to a preset threshold, wherein the orientation relationship satisfying the preset relationship comprises:

all used reference frames being located before the current frame;

all of the used reference frames being located after the current frame; or one or more of the used reference frames being located before the current frame, and remaining reference frames being located after the current frame.

13. The apparatus according to claim 10, wherein the video bitstream comprises one or more weight lists comprising one or more weight groups, wherein the one or more weight groups comprise one or more second weight values, wherein quantities of the one or more second weight values in different weight groups are allowed to be the same or different, and values of the one or more second weight values in different weight groups are allowed to be the same or different, and wherein the determining the first determining code comprises:

second determining code configured to cause at least one of the at least one processor to determine a target weight list from the one or more weight lists based on the significance of the one or more first reference predicted values; and selecting code configured to cause at least one of the at least one processor to select, from the target weight list, the target weight group.

14. The apparatus according to claim 13, wherein a quantity of the one or more weight lists is two or more, wherein one weight list of the one or more weight lists corresponds to one threshold range, and wherein the first determining code comprises:

first obtaining code configured to cause at least one of the at least one processor to obtain one or more significance metrics of the one or more first reference predicted values;

calculating code configured to cause at least one of the at least one processor to calculate a significance difference between the one or more first reference predicted values, the significance difference being measured by a difference between:

a first significance metric of a first value of the one or more first reference predicted values, and a second significance metric of a second value of the one or more first reference predicted values;

third determining code configured to cause at least one of the at least one processor to determine a threshold range to which an absolute value of the significance difference belongs; and fourth determining code configured to cause at least one of the at least one processor to determine, as the target weight list, a weight list corresponding to the threshold range.

15. The apparatus according to claim 13, wherein the one or more first reference predicted values comprise a first value and a second value, and the video bitstream comprises a first weight list and a second weight list, and wherein the second determining code is configured to cause at least one of the at least one processor to:

compare a third value of a first significance metric of the first value with a fourth value of a second significance metric of the second value;

based on the third value being greater than the fourth value, determine the first weight list as the target weight list; and based on the third value being less than or equal to the fourth value, determine the second weight list as the target weight list, and wherein a sum of a first weight value in the first weight list and a second weight value in the second weight list in a corresponding position is 1.

16. The apparatus according to claim 13, wherein the one or more first reference predicted values comprise a first value and a second value, and the video bitstream comprises a first weight list, a second weight list, and a third weight list, wherein the second determining code is configured to cause at least one of the at least one processor to:

obtain a sign value of a difference between a third value of a first significance metric of the first value and a fourth value of a second significance metric of the second value;

based on the sign value being a first preset value, determining the first weight list as the target weight list;

based on the sign value being a second preset value, determining the second weight list as the target weight list; and based on the sign value being a third preset value, determining the third weight list as the target weight list, and wherein the first weight list, the second weight list, and the third weight list are different weight lists; or two of the first weight list, the second weight list, and the third weight list are allowed to be a same weight list.

17. The apparatus according to claim 14, wherein any one of the one or more first reference predicted values is denoted as value i, wherein the value i is derived from a reference block i, wherein a first video frame to which the reference block i belongs is a reference frame i in the video bitstream, wherein i is an integer less than or equal to a quantity of the one or more first reference predicted values, wherein a second video frame to which the current block belongs is a current frame in the video bitstream, wherein the first obtaining code comprises second obtaining code, wherein the second obtaining code is configured to cause at least one of the at least one processor to:

determine a third significance metric based on a first picture order count of the current frame and a second picture order count of the reference frame i;

determine a fourth significance metric based on the second picture order count, a quality metric of the reference frame i, and the first picture order count, the quality metric being determined based on quantization information of the current block or coding information of the reference frame i;

determine a fifth significance metric based on calculating the third significance metric and the fourth significance metric, sorting significance metric values of one or more reference frames corresponding to the one or more first reference predicted values in ascending order, and determining an index of the reference frame i in the sorting as the fifth significance metric; or adjust a calculation result in the third significance metric, the fourth significance metric, or the fifth significance metric based on a prediction mode for the value i to obtain the significance metric of the value i, and wherein the prediction mode comprises an inter prediction mode or an intra prediction mode.

18. A non-transitory computer-readable storage medium, storing computer code which, when executed by at least one processor, causes the at least one processor to at least:

acquire a video bitstream;

perform compound prediction on a current block to be decoded in the video bitstream;

based on the current block satisfying a first condition for adaptive weighted prediction, determine, for the current block based on significance of one or more first reference predicted values derived from one or more reference blocks of the current block, a target weight group comprising one or more first weight values, the significance indicating a degree of impact of a corresponding reference predicted value on decoding performance for the current block;

perform weighted prediction on the one or more first reference predicted values based on the one or more first weight values to obtain a predicted value of the current block; and reconstruct a decoded image corresponding to the current block based on the predicted value, wherein the one or more reference blocks are coding blocks referenced during decoding of the current block in the video bitstream, and wherein the one or more first reference predicted values are in a one-to-one correspondence with the one or more reference blocks.

* * * * *